(12) United States Patent
Kanbayashi et al.

(10) Patent No.: US 11,644,306 B2
(45) Date of Patent: May 9, 2023

(54) ROAD SURFACE STATE DETERMINATION APPARATUS

(71) Applicant: DENSO CORPORATION, Kariya (JP)

(72) Inventors: Ryosuke Kanbayashi, Kariya (JP); Yoichiro Suzuki, Nisshin (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 16/879,300

(22) Filed: May 20, 2020

(65) Prior Publication Data

US 2020/0309518 A1 Oct. 1, 2020

Related U.S. Application Data

(63) Continuation of application No. PCT/JP2018/043171, filed on Nov. 22, 2018.

(30) Foreign Application Priority Data

Nov. 23, 2017 (JP) .............................. JP2017-225269

(51) Int. Cl.
| | | |
|---|---|---|
| *G01B 17/00* | (2006.01) | |
| *B60C 23/04* | (2006.01) | |
| *G01P 15/00* | (2006.01) | |
| *B60W 50/14* | (2020.01) | |
| *B60W 40/06* | (2012.01) | |
| *B60W 10/184* | (2012.01) | |
| *H04W 4/40* | (2018.01) | |

(52) U.S. Cl.
CPC .......... *G01B 17/00* (2013.01); *B60C 23/0486* (2013.01); *B60W 10/184* (2013.01); *B60W 40/06* (2013.01); *B60W 50/14* (2013.01); *G01P 15/00* (2013.01); *H04W 4/40* (2018.02)

(58) Field of Classification Search
CPC ...... G01H 11/003; G01H 11/06; G01H 11/08; G01P 15/00; G01B 17/00; B60C 23/0486; B60C 23/0477; B60C 23/065; B60W 40/06; B60W 40/12; B60W 40/068; B60W 40/40; B60W 40/48; B60W 50/029; B60W 50/04; B60W 50/14; B60W 10/184; H04W 4/40
See application file for complete search history.

(56) References Cited

U.S. PATENT DOCUMENTS

| | | | | |
|---|---|---|---|---|
| 6,064,931 A | * | 5/2000 | Sawada | ................... B60T 8/172 73/11.01 |
| 7,660,669 B2 | * | 2/2010 | Tsuda | ................... B60W 30/09 340/436 |
| 2008/0067867 A1 | * | 3/2008 | Taguchi | ................. B60T 8/172 303/167 |

(Continued)

FOREIGN PATENT DOCUMENTS

| | | |
|---|---|---|
| JP | 2003291615 A | 10/2003 |
| JP | 2007079740 A | 3/2007 |

(Continued)

*Primary Examiner* — Helen C Kwok
(74) *Attorney, Agent, or Firm* — Harness, Dickey & Pierce, P.L.C.

(57) ABSTRACT

A road surface state determination apparatus includes a plurality of tire-side devices each of which detects vibration applied to corresponding tire and produces road surface data indicative of a road surface state based on data of the vibration, and a vehicle-body-side system that determines the road surface state based on the road surface data.

5 Claims, 13 Drawing Sheets

(56) References Cited

U.S. PATENT DOCUMENTS

| | | | |
|---|---|---|---|
| 2008/0195279 A1* | 8/2008 | Hattori | B60T 8/1725 701/41 |
| 2009/0012688 A1* | 1/2009 | Hattori | B60W 40/064 701/79 |
| 2009/0105921 A1* | 4/2009 | Hanatsuka | B60G 17/0165 701/80 |
| 2009/0276113 A1* | 11/2009 | Sugimoto | B60T 8/1725 701/31.4 |
| 2010/0320706 A1* | 12/2010 | Horiguchi | B62D 17/00 280/5.521 |
| 2017/0050478 A1* | 2/2017 | Ijima | G01L 17/00 |
| 2017/0057306 A1 | 3/2017 | Suzuki et al. | |
| 2017/0305421 A1* | 10/2017 | Sekizawa | B60T 7/12 |
| 2018/0264894 A1 | 9/2018 | Goto et al. | |
| 2020/0255019 A1* | 8/2020 | Sekizawa | H04W 4/40 |
| 2020/0256672 A1* | 8/2020 | Sekizawa | B60T 8/172 |

FOREIGN PATENT DOCUMENTS

| | | |
|---|---|---|
| JP | 2015174636 A | 10/2015 |
| JP | 2016088429 A | 5/2016 |
| JP | 2016107833 A | 6/2016 |

\* cited by examiner

ROAD SURFACE STATE DETERMINATION APPARATUS

CROSS REFERENCE TO RELATED APPLICATIONS

The present application is a continuation application of International Patent Application No. PCT/JP2018/043171 filed on Nov. 22, 2018, which designated the U.S. and claims the benefit of priority from Japanese Patent Application No. 2017-225269 filed on Nov. 23, 2017. The entire disclosures of all of the above applications are incorporated herein by reference.

TECHNICAL FIELD

The present disclosure relates to a road surface state determination apparatus.

BACKGROUND

For example, an acceleration sensor is provided on a back surface of a tire tread to detect vibration applied to a tire, and a road surface state is determined based on a detection result of the vibration. In such a road surface state determination method, feature vectors are extracted from a waveform of the vibration detected by the acceleration sensor, and degrees of similarity of the extracted feature vectors to all support vectors stored for each type of the road surface are calculated to determine the road surface state. For example, the degrees of similarity of the extracted feature vectors to all the support vectors are calculated using a kernel function, and the type of the road surface, such as a dry road surface, a wet road surface, a frozen road, or a snow-covered road, having the highest degree of similarity is determined as the current road surface state on which the tire is currently traveling. Such a road surface state determination method allows highly robust road surface determination to be performed.

SUMMARY

The present disclosure describes a road surface state determination apparatus including a plurality of tire-side devices each of which detects vibration applied to corresponding tire and produces road surface data indicative of a road surface state based on data of the vibration, and a vehicle-body-side system that determines the road surface state based on the road surface data.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
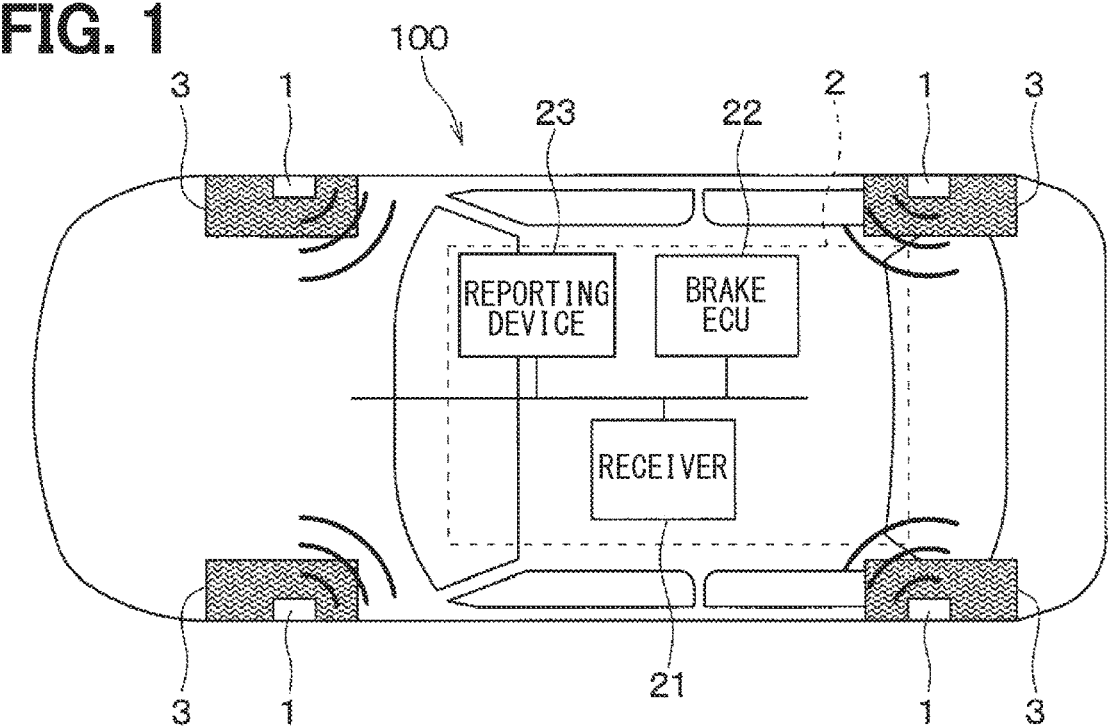
FIG. 1 is a diagram illustrating a schematic block configuration of a tire apparatus to which a road surface state determination device according to a first embodiment is applied, in a state where the tire device is mounted in a vehicle.

As a road surface state determination method, it is known to detect vibration applied to a tire using an acceleration sensor, which is attached on a back surface of a tire tread, and to determine a road surface state based on a result of the detection of the vibration. In such a method, feature vectors are extracted from a waveform of the vibration applied to the tire and detected by the acceleration sensor, and degrees of similarity between the extracted feature vectors and all support vectors, which are stored to each type of the road surface, are calculated to determine the road surface state. For example, the degrees of similarity of the extracted feature vectors to all the support vectors are calculated using a kernel function, and the type of the road surface, such as a dry road surface, a wet road surface, a frozen road, or a snow-covered road, having the highest degree of similarity is determined as the state of the road on which the vehicle is currently travelling. Such a road surface state determination method allows highly robust road surface determination to be performed.

However, when a tire-side device provided in each of the tires, such as an acceleration sensor, transmits data on a result of the detection of the vibration or the like to a receiver of a vehicle-body-side system provided in a vehicle body, the receiver may not be able to receive data from any of the tires. For example, in such a case where a place where the receiver is disposed is distant from any of the tires or where the acceleration sensor is at a Null position in accordance with rotation of the tire, a radio wave from the tire-side device may not be received by the receiver.

According to an aspect of the present disclosure, a road surface state determination apparatus includes a plurality of tire-side devices attached individually to a plurality of tires of a vehicle, and a vehicle body-side system. Each of the tire-side devices includes a vibration detection unit that outputs a detection signal corresponding to a magnitude of vibration of the tire, a waveform processing unit that generates road surface data representing a road surface state appearing in a waveform of the detection signal, and a first data communication unit that transmits the road surface data. The vehicle-body-side system includes a second data communication unit that receives the road surface data transmitted from the first data communication unit and a road surface determination unit that determines, based on the road surface data, the road surface state of a road surface on which the vehicle travels. The plurality of tire-side devices attached individually to the plurality of tires receive the road surface data from each other. Among the plurality of tire-side devices, at least one having a radio wave environment in communication with the vehicle-body-side system more excellent than that of at least another one transmits, to the vehicle-body-side system, road surface data including the road surface data of the at least another one.

Thus, at least one of the plurality of tire-side devices having the better radio wave environment in communication with the vehicle-body-side system than that of at least another one of the plurality of tire-side devices transmits, to the vehicle-body-side system, the road surface data including the road surface data received from the at least another one. By doing so, even in a situation in which the road surface data transmitted from any of the tire-side devices may not be delivered to the vehicle-body-side system, it is possible to reliably transmit the road surface data to the vehicle-body-side system. Therefore, it is possible to provide the road surface state determination apparatus which allows the tire-side devices to reliably transmit data to the vehicle-body-side system.

In a road surface state determination apparatus according to another aspect, a plurality of tire-side devices, which are attached individually to a plurality of tires, receive the road surface data from each other, and each of the plurality of tire-side devices transmits, to the vehicle-body-side system, the road surface data including the road surface data received by communication from at least another one of the plurality of tire-side devices.

Thus, each of the plurality of tire-side devices is caused to transmit, to the vehicle-body-side system, the road surface data together with the road surface data received from at least another one of the tire-side devices by communication. This can also provide the road surface state determination apparatus which allows the tire-side device included in each of the tires to reliably transmit the road surface data to the vehicle-body-side system.

In a road surface state determination apparatus according to a still another aspect, a plurality of tire-side devices, which are attached individually to a plurality of tires, receive the road surface data from each other. When the vehicle-body-side system fails to receive the road surface data transmitted from a part of the plurality of tire-side devices, the vehicle-body-side system provides a data request to one of the plurality of tire-side devices the road surface data of which has successfully received to cause the one to transmit the road surface data of the part from the one.

Thus, after each of the tire-side devices is caused to transmit the road surface data, if there is the road surface data which is not received successfully by the vehicle-body-side system, the vehicle-body-side system provides the data request to the tire-side device the road surface data of which has been received successfully by the vehicle-body-side system. This can also provide the road surface state determination apparatus which allows the tire-side device included in each of the tires to reliably transmit the road surface data to the vehicle-body-side system.

The following will describe embodiments of the present disclosure based on the drawings. Note that, in the following description of the individual embodiments, like or equivalent component parts are given like reference characters or numerals.

First Embodiment

Referring to FIGS. 1 to 10, a description will be given of a tire apparatus 100 having a road surface state determining function according to the first embodiment. The tire apparatus 100 according to the first embodiment determines a state of a road surface on which a vehicle travels, that is, a road surface state during traveling of the vehicle based on vibration applied to a ground contact surface of a tire of each of wheels of the vehicle, and also performs warning of danger to the vehicle, vehicle movement control, and the like based on the road surface state.

Figure 2:
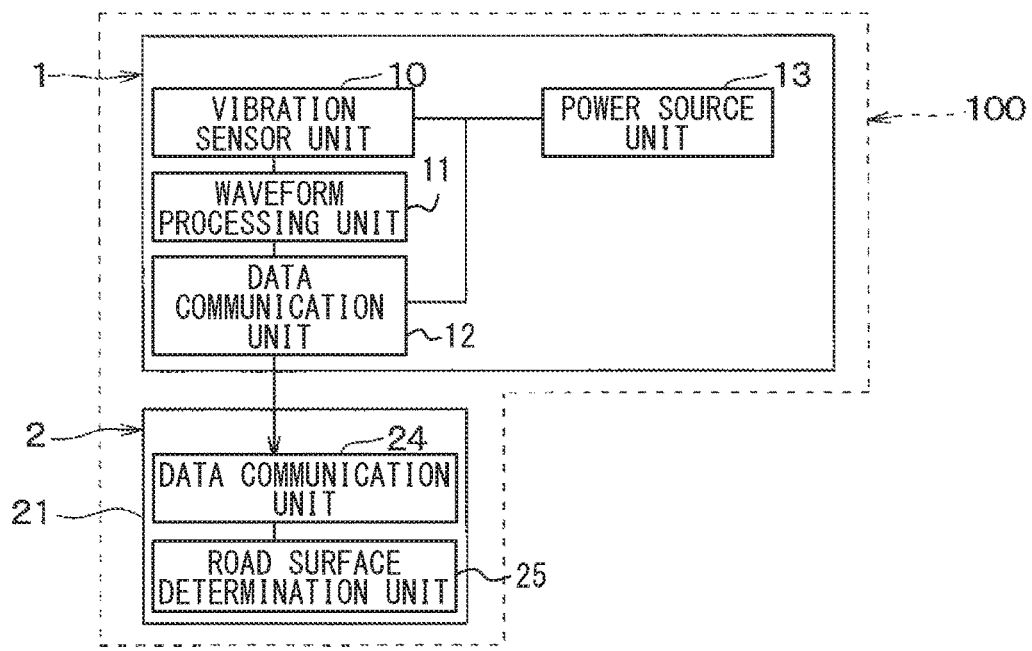
FIG. 2 is a block diagram illustrating respective details of each of tire-side devices and a vehicle-body-side system.

As illustrated in FIGS. 1 and 2, the tire apparatus 100 is configured to include tire-side devices 1 provided on wheels of a vehicle and a vehicle-body-side system 2 including individual units and integrated to a vehicle body. The vehicle-body-side system 2 includes a receiver 21, an electronic control unit for brake control (hereinafter referred to as the brake ECU) 22, a reporting device 23, and the like. Note that a portion of the tire apparatus 100 which implements the road surface state determining function corresponds to a road surface state determination apparatus. In the case of the first embodiment, the tire-side devices 1 and the receiver 21 of the vehicle-body-side system 2 are included in the road surface state determination apparatus.

The tire apparatus 100 of the first embodiment causes the tire-side devices 1 to transmit data (hereinafter referred to as road surface data) according to a state of a road surface on which tires 3 travel, and also causes the receiver 21 to receive the road surface data and determine the road surface state. The tire apparatus 100 also causes the receiver 21 to transmit a result of the determination of the road surface state to the reporting device 23, and causes the reporting device 23 to report the result of the determination of the road surface state. As a result, it is possible to report the road surface state such as a dry road, a wet road, or a frozen road to a driver and also warn the driver when the road has a slippery road surface. The tire apparatus 100 also reports the road surface state to the brake ECU 22 or the like which controls vehicle movement or the like to cause the brake ECU 22 or the like to perform vehicle movement control for avoiding danger. For example, when the road is frozen, the brake ECU 22 or the like is caused to reduce a braking force generated based on an amount of brake operation compared to that when the road is dry and thus perform vehicle movement control corresponding to a case where a road surface μ is low. Specifically, the tire-side device 1 and the receiver 21 are configured as follows.

Figure 3:
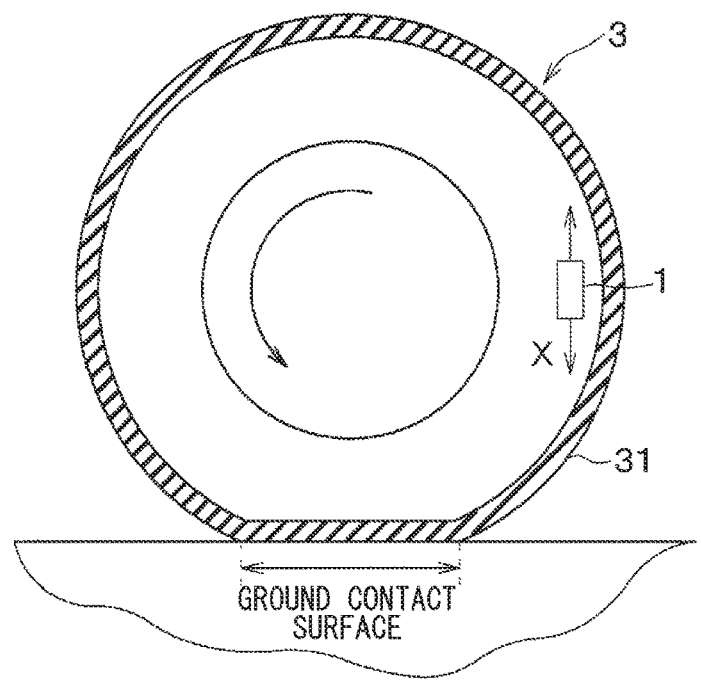
FIG. 3 is a schematic sectional diagram of a tire to which the tire-side device is attached.

The tire-side devices 1 are disposed individually in the respective tires 3 to be capable of bidirectional communication with the vehicle-body-side system 2. The tire-side devices 1 are also capable of bidirectional communication with each other. Specifically, as illustrated in FIG. 2, each of the tire-side devices 1 is configured to include a vibration sensor unit 10, a waveform processing unit 11, a data communication unit 12, and a power source unit 13. For example, as illustrated in FIG. 3, each of the tire-side devices 1 is provided on a back surface of a tread 31 of the tire 3.

The vibration sensor unit 10 forms a vibration detection unit for detecting the vibration applied to the tire 3. For example, the vibration sensor unit 10 is provided by an acceleration sensor. When the vibration sensor unit 10 is provided by the acceleration sensor, the vibration sensor unit 10 outputs an acceleration detection signal as a detection signal corresponding to a magnitude of vibration in a direction in contact with a circular path followed by the tire-side device 1 when the tire 3 rotates, i.e., a tire tangential direction shown by an arrow X in FIG. 3. More specifically, the vibration sensor unit 10 generates, as the detection signal, an output voltage having one of two directions shown by the arrow X as a positive direction and the opposite direction as a negative direction or the like. For example, the vibration sensor unit 10 detects an acceleration at predetermined sampling periods which are set to be shorter than a period of one rotation of the tire 3, and outputs the detected acceleration as the detection signal. The detection signal from the vibration sensor unit 10 is represented as an output voltage or an output current, and a case where the detection signal is represented as the output voltage is described herein by way of example.

The waveform processing unit 11 is provided by a known microcomputer including a CPU, a ROM, a RAM, an I/O, and the like. The waveform processing unit 11 performs signal processing of the detection signal based on a program stored in the ROM or the like, and generates the road surface data representing a road surface state appearing in the detection signal.

Specifically, the waveform processing unit 11 uses the detection signal output from the vibration sensor unit 10 as the detection signal representing data on vibration in the tire tangential direction to perform waveform processing of a vibration waveform represented by the detection signal and thus extract feature quantities of tire vibration. In the case of the first embodiment, by performing signal processing of the detection signal for the acceleration (hereinafter referred to as the tire G) of the tire 3, the waveform processing unit 11 extracts the feature quantities of the tire G. The waveform processing unit 11 transmits data including the extracted feature quantities as the road surface data to the data communication unit 12. Note that details of the feature quantities mentioned herein will be described later.

The waveform processing unit 11 also controls data transmission from the data communication unit 12 and transmits the road surface data to the data communication unit 12 at a timing at which data transmission is desired to be performed to cause the data communication unit 12 to perform data communication. For example, the waveform processing unit 11 extracts the feature quantities of the tire G every time the tire 3 rotates once and transmits the road surface data to the data communication unit 12 once or a plurality of times each time the tire 3 rotates once or a plurality of times. For example, the waveform processing unit 11 transmits, to the data communication unit 12, the road surface data including the feature quantities of the tire G extracted during one rotation of the tire 3 when the road surface data is transmitted to the data communication unit 12.

The data communication unit 12 corresponds to a first data communication unit that performs bidirectional communication with the vehicle-body-side system 2 and performs communication with at least another one of the tire-side devices 1. As a mode of the bidirectional communication, various modes can be used appropriately, and Bluetooth communication including Bluetooth Low Energy (BLE) communication, a wireless Local Area Network (LAN) such as wifi, Sub-GHz communication, ultra-wide band communication, ZigBee, or the like can be used appropriately. Note that "Bluetooth" is a registered trademark.

For example, when the road surface data is transmitted from the waveform processing unit 11 to the data communication unit 12, at that timing, the data communication unit 12 transmits the road surface data. The timing of the data transmission from the data communication unit 12 is controlled by the waveform processing unit 11. The road surface data is transmitted from the waveform processing unit 11 to the data communication unit 12 each time the tire 3 rotates once or a plurality of times. Every time the road surface data is transmitted from the waveform processing unit 11 to the data communication unit 12, data transmission from the data communication unit 12 is performed.

The data communication unit 12 also has the functions of receiving an instruction signal indicative of whether the tire-side device 1 is either a central device or a peripheral device and transmitting details of the instruction signal to the waveform processing unit 11.

The instruction signal mentioned herein is transmitted from the vehicle-body-side system 2 and shows, to each of the tire-side devices 1, whether the tire-side device 1 is either the central device or the peripheral device. The central device is capable of performing data transmission/reception to/from the peripheral device. The central device can transmit, to the vehicle-body-side system 2, not only data of the central device, but also data transmitted from the peripheral device. The peripheral device performs data transmission to the central device. In the present embodiment, the peripheral device does not perform an operation of receiving data from the central device. However, the peripheral device may be configured to be able to receive data from the central device.

The instruction signal may be transmitted individually to each of the tire-side devices 1. Alternatively, the instruction signal may indicate whether each of all the tire-side devices 1 is either the central device or the peripheral device. To each of the tire-side devices 1, unique identification information (hereinafter referred to as the ID information) is allocated. When it is assumed that the instruction signal is transmitted individually to each of the tire-side devices 1, the ID information of the tire-side device 1 corresponding to the instruction signal is added to the instruction signal to allow each of the tire-side devices 1 to recognize whether or not the instruction signal is addressed to the tire-side device 1. On the other hand, when it is assumed that the instruction signal indicates whether each of all the tire-side devices 1 is either the central device or the peripheral device, the ID information and data indicating whether each of the tire-side devices 1 is either the central device or the peripheral device are associated with each other. Thus, each of the tire-side devices 1 is allowed to recognize, on a per ID information set basis, whether the tire-side device 1 is either the central device or the peripheral device based on the instruction signal. As a result, each of the tire-side devices 1 can recognize not only whether the tire-side device 1 is either the central device or the peripheral device, but also whether another of the tire-side devices 1 is either the central device or the peripheral device.

Note that each of the tire-side devices 1 can also store whether the tire-side device 1 is either the central device or the peripheral device in a memory such as the ROM of the microcomputer included in the waveform processing unit 11. However, what is stored in the memory in each of the tire-side devices 1 other than the ID information is preferably set the same. Accordingly, a description will be given herein of a case where, during manufacturing of the devices, whether each of the tire-side devices 1 is either the central device or the peripheral device is not stored in the memory of the waveform processing unit 11. When receiving data from the vehicle-body-side system 2, each of the tire-side devices 1 stores details of the data so as to be able to recognize whether the tire-side device 1 is either the central device or the peripheral device, but erases the stored data when a predetermined time period elapses after the tire 3 stops rotating. As a result, when the tires 3 are subjected to tire rotation or the like, each of the tire-side devices 1 is allowed to be set again as either the central device or the peripheral device.

The power source unit 13 serves as a power source of each of the tire-side devices 1 and supplies power to each of the units included in the tire-side device 1 to operate each of the units. The power source unit 13 is provided by a battery such as a button battery. Since the tire-side device 1 is provided in the tire 3, replacement of the battery cannot easily be performed, and therefore it is required to reduce power consumption.

On the other hand, the receiver 21, the brake ECU 22, and the reporting device 23 each included in the vehicle-body-side system 2 are driven when an activation switch such as an ignition switch (not shown) is turned ON.

As illustrated in FIG. 2, the receiver 21 is configured to include a data communication unit 24 and a road surface determination unit 25.

The data communication unit 24 corresponds to a second data communication unit that performs bidirectional communication with each of the tire-side devices 1. The data communication unit 24 has the functions of receiving the road surface data including the feature quantities and transmitted from the data communication unit 12 of the tire-side device 1 and transmitting the road surface data to the road surface determination unit 25.

The road surface determination unit 25 is provided by a known microcomputer including a CPU, a ROM, a RAM, an I/O, and the like and performs various processes based on programs stored in the ROM or the like. In the case of the first embodiment, the road surface determination unit 25 measures a received radio wave intensity when the data communication unit 24 receives the road surface data.

The road surface determination unit 25 determines the road surface state based on the received road surface data. Specifically, the road surface determination unit 25 stores support vectors, and compares the road surface data transmitted from the waveform processing unit 11 to the support vectors to determine the road surface state.

The support vectors are stored and accumulated for each type of the road surface. The support vectors refer to feature quantities serving as models, which are obtained such as by learning through a support vector machine. The vehicle including the tire-side devices 1 is experimentally caused to run on each type of the road surface. In this case, the feature quantities extracted by the waveform processing unit 11 and corresponding to a predetermined number of tire rotations are learned and, from the extracted feature quantities, typical feature quantities corresponding to the predetermined number of rotations are extracted to be used as the support vectors. For example, the feature quantities corresponding to 1,000,000 rotations are learned for each type of the road surface and, from the learned feature quantities, typical feature quantities corresponding to 100 rotations are extracted to be used as the support vectors.

Then, the road surface determination unit 25 compares the feature quantities transmitted from the tire-side device 1 and received by the data communication unit 24 to the respective support vectors stored for each type of the road surface to determine the road surface state. For example, the road surface determination unit 25 compares the feature quantities included in the road surface data received most recently to the support vectors stored for each type of the road surface, and determines the road surface corresponding to the support vectors closest to the feature quantities as a currently traveled road surface.

When determining the road surface state, the road surface determination unit 25 transmits the determined road surface state to the reporting device 23 and causes the reporting device 23 to transmit the road surface state to the driver as required. As a result, the driver tries to drive in consideration of the road surface state and can avoid danger to the vehicle. For example, the reporting device 23 may be configured to constantly display the road surface state determined by the road surface determination unit 25 or be configured to display the road surface state to warn the driver only when the determined road surface state is a state that requires a driver to drive more carefully, such as a wet road, a frozen road, or the like. In addition, the receiver 21 reports the road surface state to the ECU for performing the vehicle movement control, such as the brake ECU 22, to allow the vehicle movement control to be performed based on the reported road surface state.

The brake ECU 22 is included in a braking control device which performs various brake control. Specifically, the brake ECU 22 drives an actuator for controlling a brake fluid pressure to increase or decrease the pressure in a wheel cylinder and control a braking force. The brake ECU 22 can also independently control a braking force applied to each of the wheels. When the road surface state is transmitted to the brake ECU 22 from the receiver 21, the brake ECU 22 performs control of the braking force as the vehicle movement control based on the road surface state. For example, when the transmitted road surface state indicates a frozen road, the brake ECU 22 reduces the braking force generated based on an amount of brake operation performed by the driver compared to that generated when the transmitted road surface state is a dry road surface. This can restrict a wheel slip and allow the driver to avoid danger to the vehicle.

The reporting device 23 is provided by a meter indicator or the like and used to report the road surface state to the driver. When the reporting device 23 is provided by the meter indicator, the meter indicator is disposed at a place where the meter indicator is visually recognizable by the driver while driving the vehicle and disposed such as in an instrument panel in the vehicle. When the road surface state is transmitted from the receiver 21 to the meter indicator, the meter indicator performs display in a mode in which the driver can recognize the road surface state, and thus allows the road surface state to be visually reported to the driver.

Note that the reporting device 23 may also be provided by a buzzer, a voice guidance device, or the like. In that case, the reporting device 23 can aurally report the road surface state to the driver using a buzzer sound or voice guidance.

As the reporting device 23 that performs visual reporting, the meter indicator has been described by way of example, but the reporting device 23 may also be formed of a display element which displays information, such as a head-up display.

In this way, the tire apparatus 100 according to the first embodiment is configured. Note that the individual units included in the vehicle-body-side system 2 are connected to each other via an in-vehicle Local Area Network (LAN) based on such as a Controller Area Network (CAN) communication or the like. This allows the individual units to transmit information to each other via the in-vehicle LAN.

The tire apparatus 100 according to the first embodiment is configured as described above. Next, a description will be given of details of the feature quantities extracted by the waveform processing unit 11 described above.

The feature quantities mentioned herein are quantities representing features of vibration applied to the tire 3, which have been acquired by the vibration sensor unit 10, and are represented as feature vectors, for example.

Figure 4:
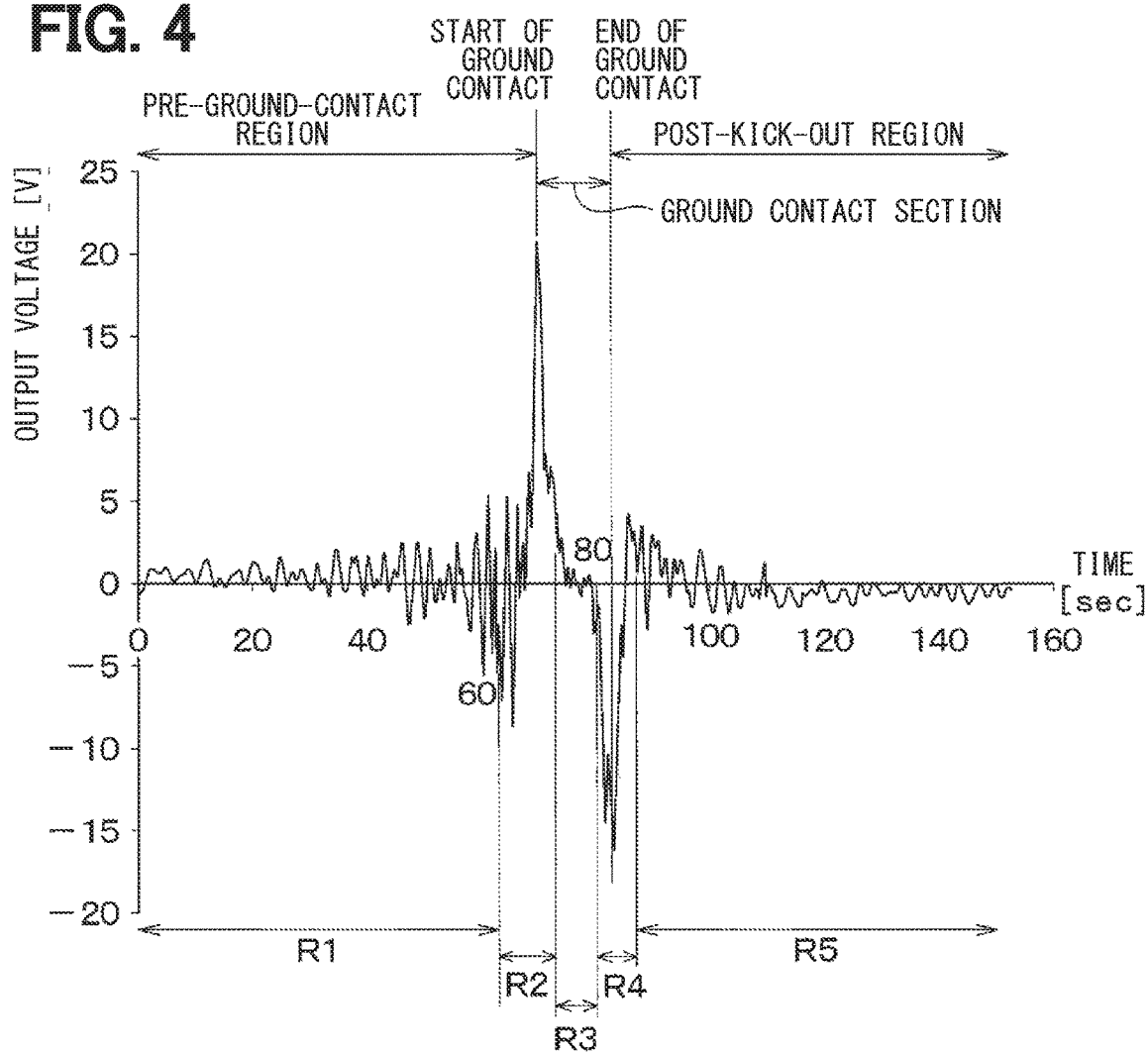
FIG. 4 is a waveform chart of an output voltage from a vibration sensor unit during tire rotation.

The output voltage of the detection signal from the vibration sensor unit 10 during tire rotation has a waveform, for example, as illustrated in FIG. 4. As illustrated in FIG. 4, at a ground contact start time when a portion of the tread 31 corresponding to a place where the vibration sensor unit 10 is disposed starts to come into contact with the ground with the rotation of the tire 3, the output voltage from the vibration sensor unit 10 has a maximum value. A peak value at the ground contact start time where the output voltage from the vibration sensor unit 10 has the maximum value is hereinafter referred to as a first peak value. As also illustrated in FIG. 4, at a ground contact end time when the portion of the tread 31 corresponding to the place where the vibration sensor unit 10 is disposed, which has been in contact with the ground, comes out of contact with the ground with the rotation of the tire 3, the output voltage from the vibration sensor unit 10 has a minimum value. A peak value at the ground contact end time when the output voltage from the vibration sensor unit 10 has the minimum value is hereinafter referred to as a second peak value.

The following is the reason why the output voltage from the vibration sensor unit 10 has the peak values at the timings described above. That is, when the portion of the tread 31 corresponding to the place where the vibration sensor unit 10 is disposed comes into contact with the ground with the rotation of the tire 3, a portion of the tire 3 which has been a generally cylindrical surface in the vicinity of the vibration sensor unit 10 receives a pressure to be deformed into a planar shape. At this time, the vibration sensor unit 10 receives an impact, and consequently the output voltage from the vibration sensor unit 10 has the first peak value. On the other hand, when the portion of the tread 31 corresponding to the place at which the vibration sensor unit 10 is disposed comes out of contact with the ground contact surface with the rotation of the tire 3, the tire 3 is released from the pressure in the vicinity of the vibration sensor unit 10 and returned from the planar shape to a generally cylindrical shape. The vibration sensor unit 10 receives an impact when the tire 3 is returned to the original shape, and consequently the output voltage from the vibration sensor unit 10 has the second peak value. Thus, the output voltage from the vibration sensor unit 10 has the first and second peak values at the ground contact start time and the ground contact end time. In addition, since the direction of the impact when the tire 3 receives the pressure is opposite to the direction of the impact when the tire 3 is released from the pressure, signs of the output voltages are also opposite to each other.

A moment when the portion of the tire tread 31 corresponding to the place where the vibration sensor unit 10 is disposed comes into contact with the ground at the road surface is assumed to fall within a "step-on region", while a moment when the portion of the tire tread 31 corresponding to the place where the vibration sensor unit 10 is disposed leaves the road surface is assumed to fall within a "kick-out region". The "step-on region" includes the timing with which the first peak value is reached, while the "kick-out region" includes the timing with which the second peak value is reached. It is also assumed that a region before the "step-on region" is a "pre-step-on region", a region between the step-on region and the kick-out region, i.e., a region where the portion of the tire tread 31 corresponding to the place where the vibration sensor unit 10 is disposed is in contact with the ground is a "pre-kick-out region", and a region after the kick-out region is a "post-kick-out region". Thus, a period during which the portion of the tire tread 31 corresponding to the place where the vibration sensor unit 10 is disposed is in contact with the ground and periods before and after the period can be segmented into the five regions. Note that, in FIG. 4, the "pre-step-on region", the "step-on region", the "pre-kick-out region", the "kick-out region", and the "post-kick-out region" of the detection signal are successively shown as five regions R1 to R5.

Depending on the road surface state, vibration occurred in the tire 3 varies from one of the regions resulting from the segmentation to another, and the detection signal from the vibration sensor unit 10 varies from one of the regions to another. Accordingly, by subjecting the detection signal from the vibration sensor unit 10 in each of the regions to frequency analysis, the road surface state of the road surface on which the vehicle travels is detected. For example, in a slippery road surface state such as that of a hard-compacted snow road, a sheering force at a kick-out time deteriorates, and consequently a band value selected in a 1 kHz to 4 kHz band decreases in the kick-out region R4 and the post-kick-out region R5. Thus, each of frequency components of the detection signal from the vibration sensor unit 10 varies depending on the road surface state, and therefore it is possible to determine the road surface state based on the frequency analysis of the detection signal.

Figure 5:
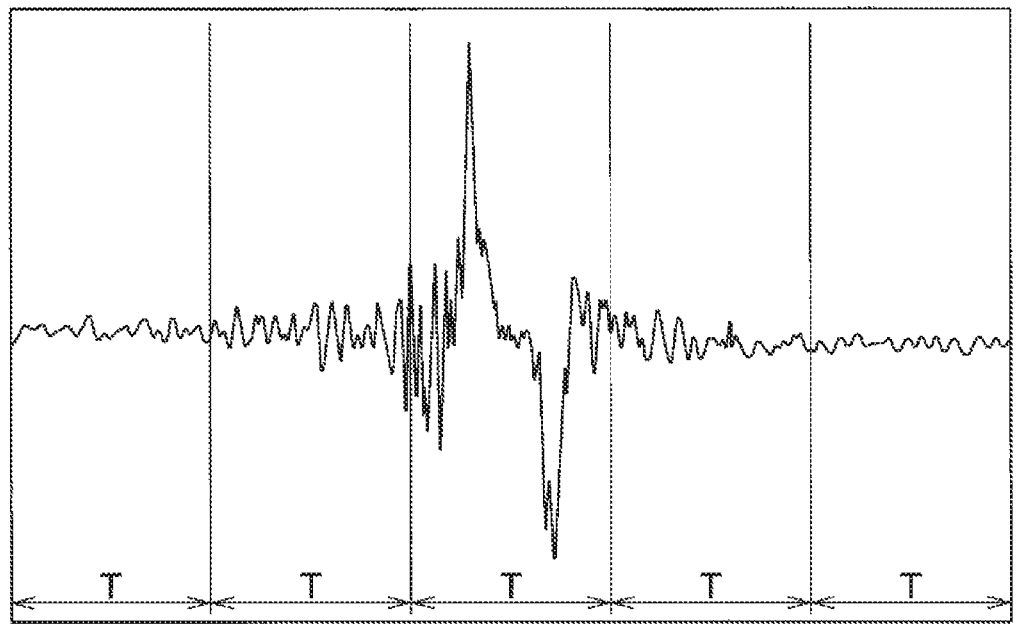
FIG. 5 is a diagram illustrating a detection signal from the vibration sensor unit, which is segmented by time windows each having a predetermined time width T.

Accordingly, the waveform processing unit 11 segments, by each of time windows having a predetermined time width T, the detection signal from the vibration sensor unit 10 corresponding to one rotation of the tire 3 which exhibits a continuous time axis waveform into the plurality of segments as illustrated in FIG. 5, and performs the frequency analysis in each of the segments to extract the feature quantities. Specifically, by performing the frequency analysis in each of the segments, the waveform processing unit 11 determines a power spectral value in each of the frequency bands, i.e., a vibration level in a specified frequency band, and uses the power spectral values as the feature quantities.

Note that the number of the segments resulting from the segmentation using the time window having the time width T is a value which varies depending on a vehicle speed, more specifically the rotating speed of the tire 3. In the following description, the number of segments corresponding to one rotation of the tire is assumed to be n (n is a natural number).

For example, the power spectral values obtained by causing the detection signal in each of the segments to pass through filters in a plurality of specified frequency bands are used as the feature quantities. The filters are, for example, five bandpass filters in a 0 to 1 kHz frequency band, a 1 to 2 kHz frequency band, a 2 to 3 kHz frequency band, a 3 to 4 kHz frequency band, and a 4 to 5 kHz frequency band. The feature quantities are referred to as the feature vectors. When each of the power spectral values in the individual specified frequency bands is represented by $a_{ik}$, a feature vector Xi of a given segment i (where i is a natural number satisfying 1≤i≤n) is given as a matrix having the power spectral values $a_{ik}$ as elements by the following expression.

$$x_i = \begin{bmatrix} a_{i1} \\ a_{i2} \\ a_{i3} \\ a_{i4} \\ a_{i5} \end{bmatrix}$$  [Expression 1]

Note that k in each of the power spectral values $a_{ik}$ is the number of the specified frequency bands, i.e., the number of the bandpass filters. When the 0 to 5 kHz band is segmented into the five regions as described above, k=1 to 5 is satisfied. A determinant X collectively showing feature vectors X1 to Xn of all the segments 1 to n is given by the following expression.

$$X = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix}$$  [Expression 2]

The determinant X serves as the expression representing the feature quantities corresponding to one tire rotation. The waveform processing unit 11 performs frequency analysis of the detection signal from the vibration sensor unit 10 to extract the feature quantities represented by the determinant X.

Subsequently, referring to FIGS. 6 and 7, a description will be given of the determination of the road surface state by the tire apparatus 100 according to the first embodiment. Note that the description is given herein on the assumption that the vehicle at a stop has started to drive.

Figure 6:
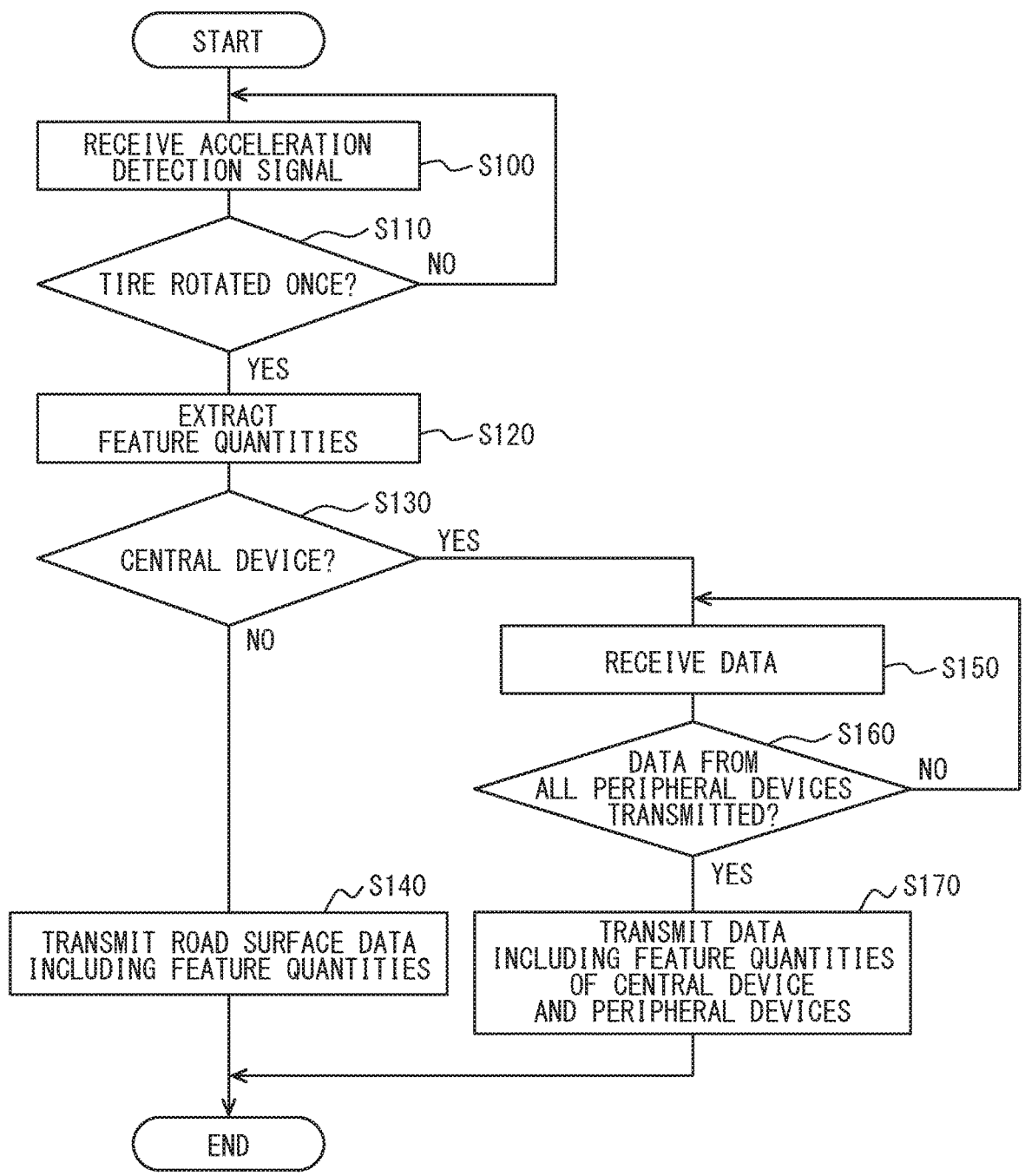
FIG. 6 is a flow chart of a data transmission process to be performed by the tire-side device.

In the tire-side device 1 of each of the wheels, the waveform processing unit 11 performs a data transmission process illustrated in FIG. 6. Meanwhile, in the vehicle-body-side system 2, the road surface determination unit 25 performs a road surface state determination process illustrated in FIG. 7. Note that the following will sequentially describe each of the processes in FIGS. 6 and 7 along a time series from the start of driving.

First, in each of the tire-side devices 1, the waveform processing unit 11 performs the data transmission process illustrated in FIG. 6 in every predetermined control cycle. In S100, the waveform processing unit 11 performs a process of receiving the detection signal from the vibration sensor unit 10. This process is continued until it is determined, in a subsequent S110, that the tire 3 has rotated once. Then, when receiving the detection signal corresponding to the one tire rotation from the vibration sensor unit 10, the waveform processing unit 11 advances to subsequent S120 and extracts feature quantities of a time axis waveform of the detection signal received from the vibration sensor unit 10 corresponding to the one tire rotation.

Note that the waveform processing unit 11 determines one rotation made by the tire 3 based on the time axis waveform of the detection signal from the vibration sensor unit 10. Specifically, since the detection signal exhibits the time axis waveform illustrated in FIG. 4, it is possible to recognize one rotation of the tire 3 by recognizing the first peak value and the second peak value of the detection signal.

Note that the road surface state appears as a change in the time axis waveform of the detection signal particularly during a period including the "step-on region", the "pre-kick-out region", and the "kick-out region", and periods before and after these regions. Accordingly, it is sufficient that data during this period is received, and it is not necessarily required that all the data sets represented by the detection signal from the vibration sensor unit 10 during one tire rotation are received. For example, with respect to the "pre-step-on region" and the "post-kick-out region", it is sufficient that there is only data in the vicinity of the "step-on region" and in the vicinity of the "kick-out region". Therefore, it may also be possible to regard a region of the detection signal from the vibration sensor unit 10 where the vibration level is smaller than a predetermined threshold as a period included in the "pre-step-on region" or the "post-kick-out region" during which the detection signal is less likely to be affected by the road surface state and prevent the detection signal from being received.

The extraction of the feature quantities in S120 is performed in the manner described above.

Then, in S130, the waveform processing unit 11 determines whether or not the tire-side device 1 including the waveform processing unit 11 is the central device. When the traveling is started, data indicating whether the tire-side device 1 is either the central device or the peripheral device has been erased and no longer stored. Consequently, in the present step, the waveform processing unit 11 makes a negative determination, and advances to S140.

In S140, the waveform processing unit 11 transmits, to the data communication unit 12, the road surface data including the feature quantities extracted in the most recent control cycle. As a result, the data communication unit 12 transmits the road surface data including the feature quantities.

Figure 7:
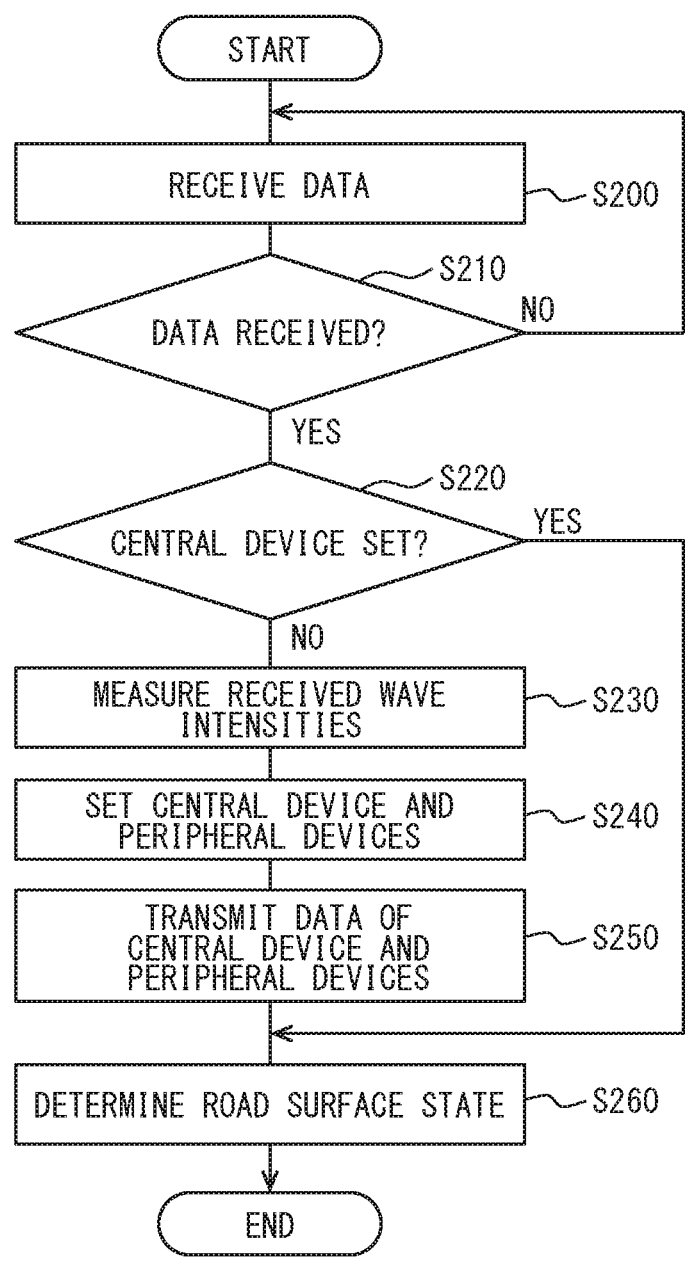
FIG. 7 is a flow chart of a road surface state determination process to be performed by the vehicle-body-side system.

Meanwhile, in the receiver 21, when the activation switch such as the ignition switch is turned ON, the road surface determination unit 25 performs the road surface state determination process illustrated in FIG. 7. This process is performed in every predetermined control cycle.

First, in S200, a data reception process is performed. When the data communication unit 24 receives the road surface data, this process is begun as the road surface determination unit 25 retrieves the road surface data. When the data communication unit 24 has not performed data reception, the road surface determination unit 25 ends the present process without retrieving any road surface data.

The road surface determination unit 25 advances to S210 and determines whether or not there is data reception. When data has been received herein, the road surface determination unit 25 advances to S220. When no data has been received, the road surface determination unit 25 repeats the process in S200 and S210 until data is received.

In S220, the road surface determination unit 25 determines whether or not the central device has been set. When the traveling is started, the central device has not been set yet, and consequently the road surface determination unit 25 makes a negative determination herein and advances to S230.

In S230, the road surface determination unit 25 measures the received radio wave intensity, i.e., the intensity of a radio wave when data is received. When each of the tire-side devices 1 performs data transmission, the radio wave intensity attenuates depending on a distance from the tire-side device 1 to the receiver 21, a peripheral environment such as a path through which the radio wave is transmitted from the tire-side device 1 to the receiver 21, or the like. Since the intensity of the radio wave used when each of the tire-side devices 1 performs data transmission is determined, the higher received radio wave intensity means a more excellent radio wave environment and easier transmission of the radio wave to the receiver 21. Accordingly, in S240, the road surface determination unit 25 sets one of the tire-side devices 1 which is highest in received radio wave intensity as the central device, based on the received radio wave intensities measured in S230. On the other hand, remaining tire-side devices 1, that is, the tire-side devices 1 other than the tire-side device 1 set as the central device are set as the peripheral devices.

Then, the road surface determination unit 25 advances to S250. In S250, the road surface determination unit 25 associates the instruction signal representing data indicating whether each of the tire-side devices 1 is either the central device or the peripheral device with the ID information of each of the tire-side devices 1, and transmits the instruction signal to each of the tire-side devices 1. This allows each of the tire-side devices 1 to recognize whether the tire-side device 1 is either the central device or the peripheral device.

Note that the tire-side device 1 which is highest in received radio wave intensity is selected herein as the central device having an excellent radio wave environment in the communication with the vehicle-body-side system 2. However, this is only exemplary, and it may be appropriate to set at least one of the plurality of tire-side devices 1 which is higher in received radio wave intensity than another one of the tire-side devices 1 as the central device. As further another example, since there is a possibility that the radio wave environment changes with the rotation of the tire 3, it may also be possible to set the tire-side device 1 having a largest average value as the central device based on a result of measuring the received radio wave intensity a plurality of times.

Then, the road surface determination unit 25 advances to S260 and determines the road surface state. The determination of the road surface state is performed by comparing the feature quantities included in the received road surface data to the support vectors stored for each type of the road surface in the road surface determination unit 25. For example, the road surface determination unit 25 determines the degrees of similarity of the feature quantities to all the support vectors stored for each type of the road surface, and determines that the road surface corresponding to the support vectors having the highest degree of similarity is the currently traveled road surface.

For example, the calculation of the degrees of similarity of the feature quantities to all the support vectors stored for each type of the road surface can be performed by a method as described below.

As described above, it is assumed with respect to the determinant X representing the feature quantities that a determinant representing the feature quantities is X(r), a determinant representing the support vectors is X(s), and the power spectral values $a_{ik}$ serving as respective elements of the determinants are represented by $a(r)_{ik}$ and $a(s)_{ik}$. In that case, the determinant X(r) representing the feature quantities and the determinant X(s) representing the support vectors are represented as follows.

$$x(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Expression 3]}$$

$$x(s) = \begin{pmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{[Expression 4]}$$

The degree of similarity represents a degree to which the feature quantities and the support vectors which are represented by the two determinants are similar to each other, and indicates that, as the degree of similarity is higher, the feature quantities and the support vectors are more similar to each other. In the case of the first embodiment, the road surface determination unit 25 determines the degree of similarity using a kernel method, and determines the road surface state based on the degree of similarity. The road surface determination unit 25 calculates herein an inner product of the determinant X(r) representing the feature quantities and the determinant X(s) representing the support vectors, i.e., a distance between respective coordinates represented by the respective feature vectors Xi of the individual segments resulting from the segmentation using each of the time windows having the predetermined time width T in a feature space, and uses the inner product as the degree of similarity.

Figure 8:
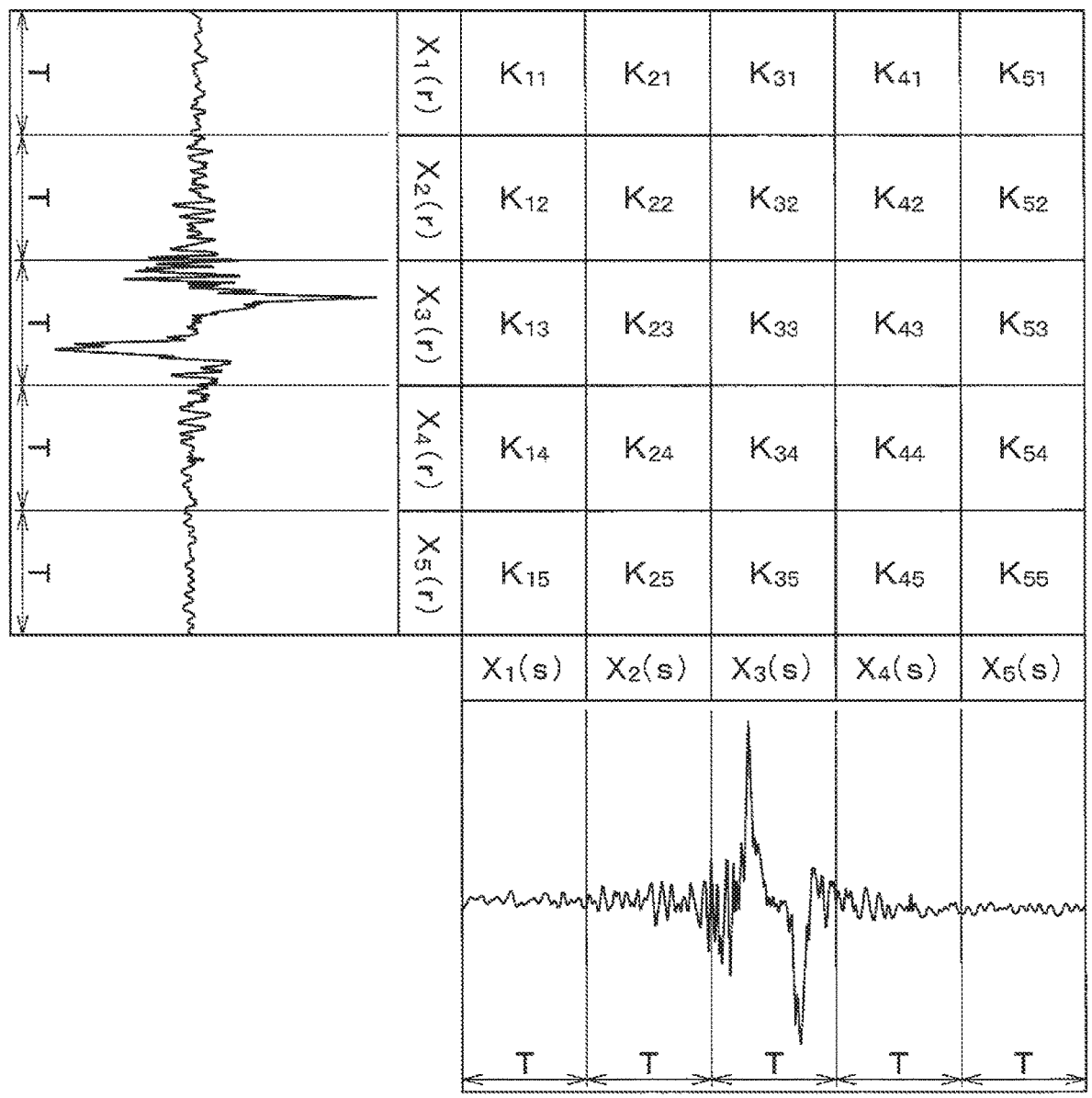
FIG. 8 is a graph illustrating relationships between determinants Xi(r) and Xi(s) and a distance $K_{yz}$ in each of the segments resulting from segmentation of a time axis waveform during a most recent rotation of the tire and a time axis waveform during an immediately previous rotation of the tire by the time windows each having the predetermined time width T.

For example, as illustrated in FIG. 8, as the time axis waveform of the detection signal from the vibration sensor unit 10, each of the time axis waveform during the most recent rotation of the tire 3 and the time axis waveform of the support vectors is segmented into individual segments by the time window having the predetermined time width T. In the case of the illustrated example, each of the time axis waveforms is segmented into the five segments, and accordingly n=5 is satisfied, and i is given by $1 \leq i \leq 5$. It is assumed herein that, as illustrated in the drawing, the feature vectors Xi of the individual segments during the most recent rotation of the tire 3 are Xi(r), and the feature vectors of the individual segments of the support vectors are Xi(s). In that case, distances $K_{yz}$ between the coordinates represented by the feature vectors Xi of the individual segments are represented as in cells where cells containing the feature vectors Xi(r) of the individual segments during the most recent rotation of the tire 3, which are arranged laterally to cells containing the distances $K_{yz}$, and cells containing the feature vectors Xi(s) of the individual segments of the support vectors, which are arranged vertically to the cells containing the distances $K_{yz}$, cross each other. Note that, in each of the distances $K_{yz}$, y corresponds to i in Xi(s), while z corresponds to i in Xi(r). Actually, depending on the vehicle speed, the number of the segments during the most recent rotation of the tire 3 may be different from the number of the segments of the support vectors. However, a case where the number of the segments during the most recent rotation of the tire 3 is the same as the number of the segments of the support vectors is shown by way of example.

In the case of the first embodiment, the feature vectors are acquired by segmenting each of the time axis waveforms into the five specified frequency bands. Consequently, the feature vectors Xi of the individual segments are represented in a six-dimensional space including the time axis, and the distances between the coordinates represented by the feature vectors Xi of the individual segments correspond to distances between the coordinates in the six-dimensional space. However, since the distances between the coordinates represented by the feature vectors of the individual segments are smaller as the feature quantities and the support vectors are more similar to each other and larger as the feature quantities and the support vectors are less similar to each other, smaller distances represent higher degrees of similarity, while larger distances represent lower degrees of similarity.

For example, when segments 1 to n are provided by time division, each of the distances $K_{yz}$ between the coordinates represented by the feature vectors of the individual segments 1 is given by the following expression.

[Expression 5]
$$K_{yz} = \sqrt{\{a(r)_{11} - a(s)_{11}\}^2 + \{a(r)_{12} - a(s)_{12}\}^2 + \ldots \{a(r)_{15} - a(s)_{15}\}^2}$$

Thus, the distances $K_{yz}$ between the coordinates represented by the feature vectors of the individual segments obtained by time division are determined for all the segments, a total sum $K_{total}$ of the distances $K_{yz}$ for all the segments is arithmetically determined, and the total sum $K_{total}$ is used as a value corresponding to the degree of similarity. Then, the total sum $K_{total}$ is compared to a predetermined threshold Th and, when the total sum $K_{total}$ is larger than the threshold Th, it is determined that the degree of similarity is low. When the total sum $K_{total}$ is smaller than the threshold Th, it is determined that the degree of similarity is high. Such calculation of the degrees of similarity is performed with respect to all the support vectors, and it is determined that the type of the road surface corresponding to the support vectors having the highest degree of similarity is the currently traveled road surface state. Thus, the road surface state can be determined.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of the segments, can be used or, alternatively, as shown in Patent Document 1, it is also possible to determine the degree of similarity using various kernel functions. Still alternatively, it may also be possible to arithmetically determine the degree of similarity by removing paths having lower degrees of similarity from all the feature vectors without using all the feature vectors.

Meanwhile, as described above, when the instruction signal representing the data indicating whether each of the tire-side devices 1 is either the central device or the peripheral device is transmitted in S250, the tire-side device 1 is allowed to recognize whether the tire-side device 1 is either the central device or the peripheral device. Consequently, in the tire-side device 1 set as the central device, the road surface determination unit 25 makes an affirmative determination in Step S130, and then advances to S150.

In S150, the waveform processing unit 11 performs a data reception process. As a result, the tire-side device 1 set as the central device receives the road surface data from another tire-side device 1 set as the peripheral device. Note that the data reception is described herein as the process performed in S150, but the data reception need not necessarily be performed in the order in the process illustrated in FIG. 6. The data reception may also be performed at any timing in a period during which the data transmission process is performed.

Subsequently, when it is determined that the road surface data from each of all the tire-side devices 1 set as the peripheral devices is received in S160, the process flow advances to S170, and the road surface data is transmitted from the tire-side device 1 set as the central device. In this case, the waveform processing unit 11 of the tire-side device 1 set as the central device transmits, as the road surface data, the road surface data including not only the feature quantities of the tire-side device 1 set as the central device, but also the feature quantities included in the road surface data transmitted from the tire-side devices 1 set as the peripheral devices. In addition, to allow the tire-side devices 1 by which the feature quantities are extracted to be recognized, the road surface data is associated with the ID information of each of the tire-side devices 1.

Note that, since the road surface determination unit 25 makes a negative determination in S130, each of the tire-side devices 1 set as the peripheral devices transmits the road surface data including the feature quantities in S140. The tire-side device 1 set as the central device receives the road surface data transmitted from each of the tire-side devices 1 set as the peripheral devices in the process in S150.

After the central device has been set, the road surface determination unit 25 makes an affirmative determination in S220 in the road surface state determination process illustrated in FIG. 7, omits the process in S230 to S250, and performs the process in S260. Then, the road surface determination unit 25 determines the road surface state based on the road surface data transmitted from the tire-side device 1 set as the central device in S170 of FIG. 6, i.e., on the feature quantities extracted by both of the tire-side device 1 set as the central device and the tire-side devices 1 set as the peripheral devices.

In this way, the tire-side device 1 set as the central device having the excellent radio wave environment transmits, to the vehicle-body-side system 2, the road surface data including also the road surface data from the tire-side devices 1 set as the peripheral devices each having the less excellent radio wave environment.

Figure 9:
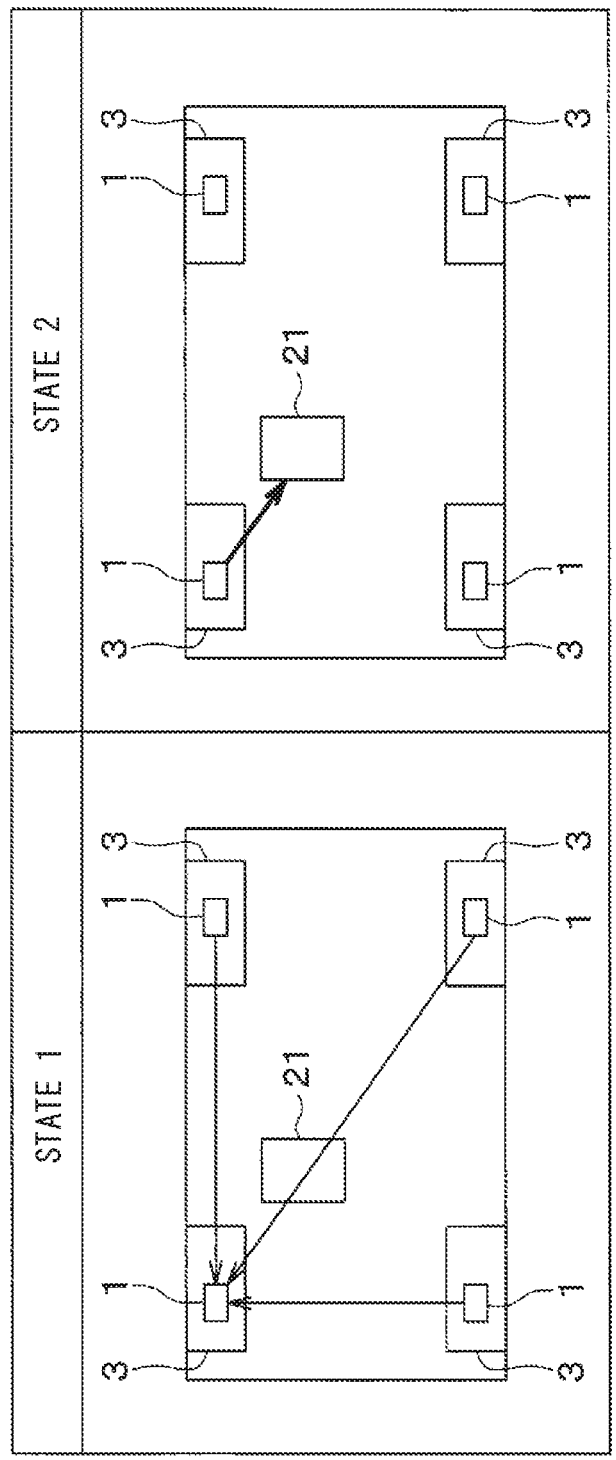
FIG. 9 is a diagram illustrating data transmission when a road surface state is determined in the first embodiment.

Specifically, when the setting of the central device and the peripheral devices is completed, first, as illustrated in State 1 in FIG. 9, each of the tire-side devices 1 set as the peripheral devices transmits the road surface data to the tire-side device set as the central device. Then, as illustrated in State 2 in FIG. 9, the tire-side device 1 set as the central device transmits, to the vehicle-body-side system 2, the road surface data including the feature quantities extracted by each of the tire-side devices 1 set as the peripheral devices.

By doing so, even in a situation in which the road surface data transmitted from any of the tire-side devices 1 set as the peripheral devices may not possibly be delivered to the vehicle-body-side system 2, the road surface data can reliably be transmitted to the vehicle-body-side system 2. Therefore, it is possible to provide the road surface state determination apparatus which allows data to be reliably transmitted from the tire-side device included in each of the tires to the vehicle-body-side system.

Note that each of thin-line arrows in FIG. 9 means that, from the tire-side device 1, the road surface data including the feature quantities of the tire-side device 1 is transmitted.

Meanwhile, a thick-line arrow means that, from the tire-side device 1, the road surface data including not only the feature quantities of the tire-side device 1, but also the feature quantities of the other tire-side devices 1 is transmitted. In the drawings used in the following description, the meaning of the thin-line arrow and the thick-line arrow is the same as described above.

While the description has been given heretofore using a four-wheeled vehicle as an example, the road surface state determination apparatus in the first embodiment is also applicable to a large-sized vehicle including a plurality of wheels the number of which is larger than four, such as a truck or a trailer.

Figure 10:
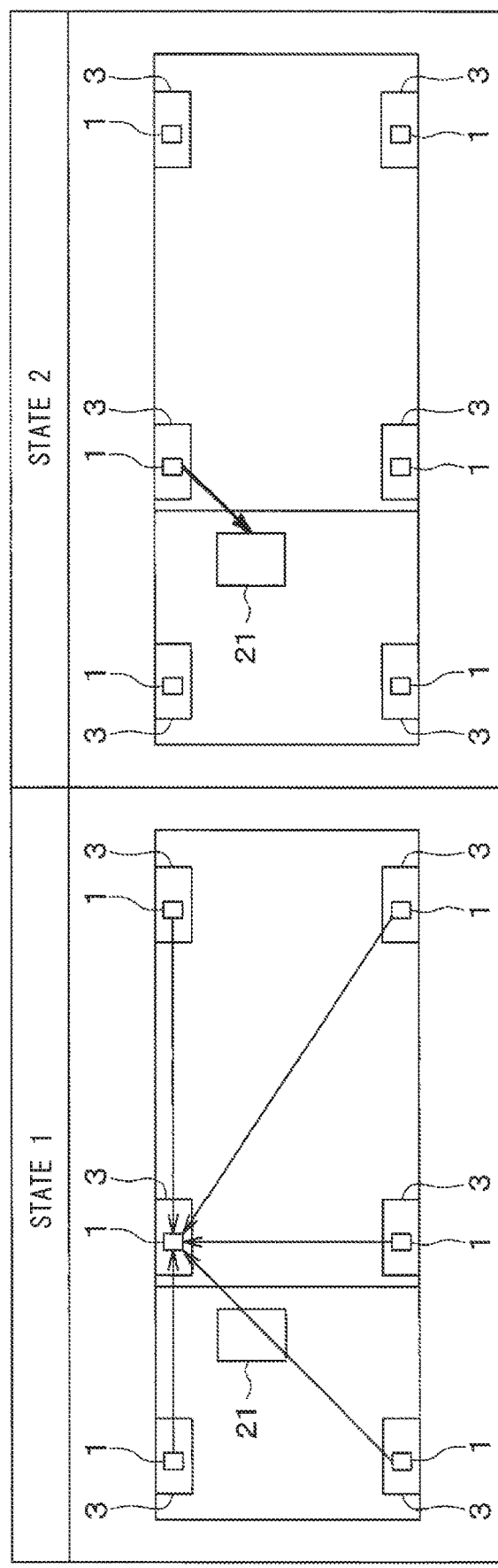
FIG. 10 is a diagram illustrating data transmission when the determination of the road surface state of the first embodiment is applied to a large-sized vehicle.

For example, as illustrated in State 1 in FIG. 10, the left side in the plane of the paper sheet with FIG. 10 is assumed to correspond to the front side of the vehicle, and the second right wheel from the front side in the vehicle is assumed to have a radio wave environment in which the tire-side device 1 of the second right wheel is set as the central device. In such a case also, when the central device is set as illustrated in State 1, each of the tire-side devices 1 set as the peripheral devices transmits the road surface data to the tire-side device 1 set as the central device. Then, as illustrated in State 2 in FIG. 10, the tire-side device 1 set as the central device transmits, to the receiver 21, the road surface data including the feature quantities extracted by each of the tire-side devices 1 set as the peripheral devices 1. Thus, the road surface state determination apparatus is also applicable to a road surface state determination apparatus for a vehicle having wheels the number of which is larger than four. Particularly in a large-sized vehicle, a wheel at a longer distance from the receiver 21 tends to have a poor radio wave environment, and it may be required to dispose the receivers 21 at a plurality of locations. In such a case, when the road surface state can be determined as in the first embodiment, it can be sufficient to use the only one receiver 21, and the effect of being able to simplify a device configuration can also be obtained.

Note that, in S210, the road surface determination unit 25 basically makes an affirmative determination when the receiver 21 receives the road surface data from each of all the tire-side devices 1. However, it may be possible that the road surface data cannot be received from each of all the tire-side devices 1. Accordingly, by preliminarily storing the ID information of the tire-side devices 1 of the host vehicle in the receiver 21, for example, even when the road surface data cannot be received from any of the tire-side devices 1, it is possible to determine the tire-side device 1 from which the road surface data has not been received successfully to be the peripheral device.

Before the data indicating whether each of the tire-side devices 1 is either the central device or the peripheral device is delivered from the vehicle-body-side system 2 to the tire-side device 1, it is also possible to cause the road surface determination unit 25 to make an affirmative determination in S130 in FIG. 6. In this case, each of the tire-side devices 1 is caused to transmit the road surface data of the tire-side device 1, subsequently perform the data reception process in S150, and then perform the process in S160 to transmit the road surface data including the feature quantities of the tire-side devices 1 other than the tire-side device 1. This allows the receiver 21 to set the central device based on the magnitude of the intensity of the radio wave received from the tire-side device 1 from which the road surface data has been received successfully. The receiver 21 is also allowed to determine, based on the ID information of each of the tire-side devices 1 included in the road surface data that has been received successfully, the tire-side device 1 from which the road surface data has not been received successfully and set the tire-side device 1 as the peripheral device. Accordingly, even when the ID information of each of the tire-side devices 1 is not stored in advance, it is possible to reliably set each of all the tire-side devices 1 as either the central device or the peripheral device.

Second Embodiment

A description will be given of the second embodiment. The second embodiment uses a method of determining the road surface state different from that used in the first embodiment, and is otherwise the same as the first embodiment. Accordingly, a description will be given only of portions different from those in the first embodiment.

In the second embodiment, each of the tire-side devices 1 is not set as the central device or the peripheral device. Each of the tire-side devices 1 receives the road surface data transmitted from another tire-side device 1 and transmits again the road surface data including the feature quantities included in the received road surface data and the feature quantities extracted by the own tire-side device 1.

Figure 11:
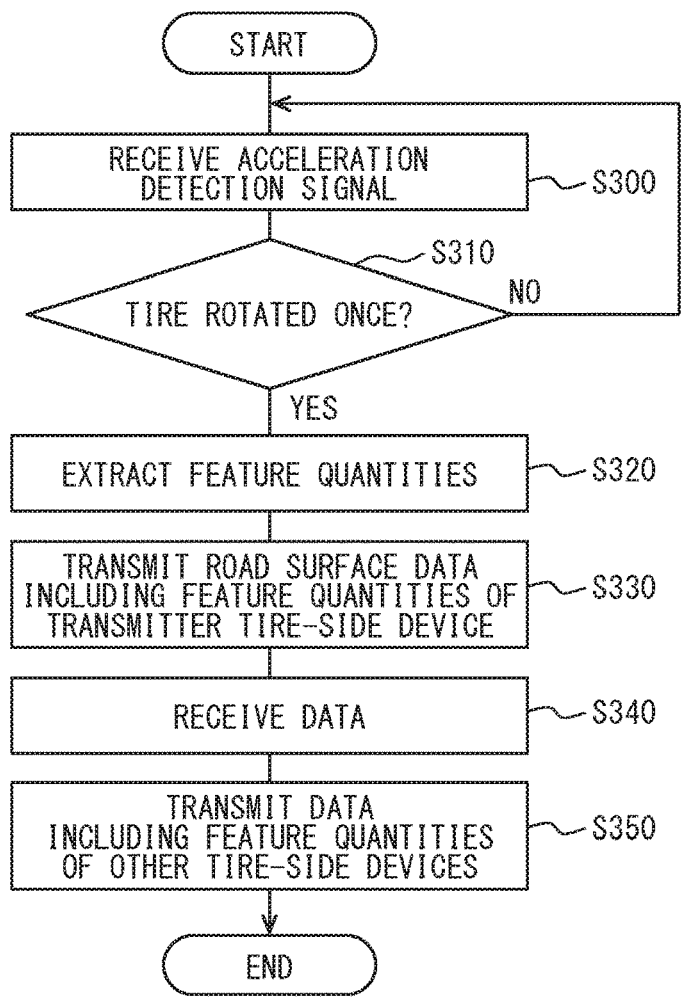
FIG. 11 is a flow chart of a data transmission process to be performed by each of tire-side devices according to a second embodiment.
Figure 12:
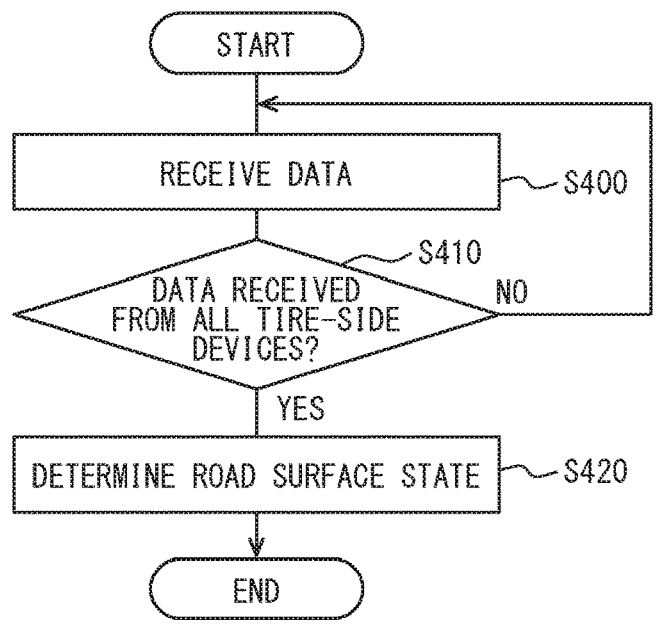
FIG. 12 is a flow chart of a road surface state determination process to be performed by a vehicle-body-side system according to the second embodiment.

Specifically, the waveform processing unit 11 of each of the tire-side devices 1 according to the second embodiment performs a data transmission process illustrated in FIG. 11, while the road surface determination unit 25 of the receiver 21 performs a road surface state determination process illustrated in FIG. 12.

First, in the data transmission process in FIG. 11, in S300 to S320, each of the tire-side devices 1 performs the same process as that performed in S100 to S120 in FIG. 6. In S330, each of the tire-side devices 1 transmits the road surface data including the feature quantities extracted by the own tire-side device 1 in the same manner as in S140. Then, in S340 and S350, each of the tire-side devices 1 performs a data reception process in the same manner as in S150 and S160. The tire-side device 1 further transmits, as the road surface data, the road surface data including not only the feature quantities extracted by the own tire-side device 1, but also the feature quantities included in the road surface data transmitted from the other tire-side devices 1. To allow the tire-side devices 1 by which the individual feature quantities are extracted to be recognized, the road surface data is caused to also include the ID information of each of the tire-side devices 1.

Meanwhile, in the road surface state determination process in FIG. 12, in S400 to S420, each of the tire-side devices 1 performs the same process as that performed in S200, S210, and S260 in FIG. 7 to determine the road surface state. Note that, in S410, when receiving the road surface data including the feature quantities of the other tire-side devices 1 transmitted in S350 in FIG. 11, the road surface determination unit 25 makes an affirmative determination. However, the road surface determination unit 25 may also make an affirmative determination even when having received the road surface data transmitted in S330 from each of all the tire-side devices 1.

Figure 13:
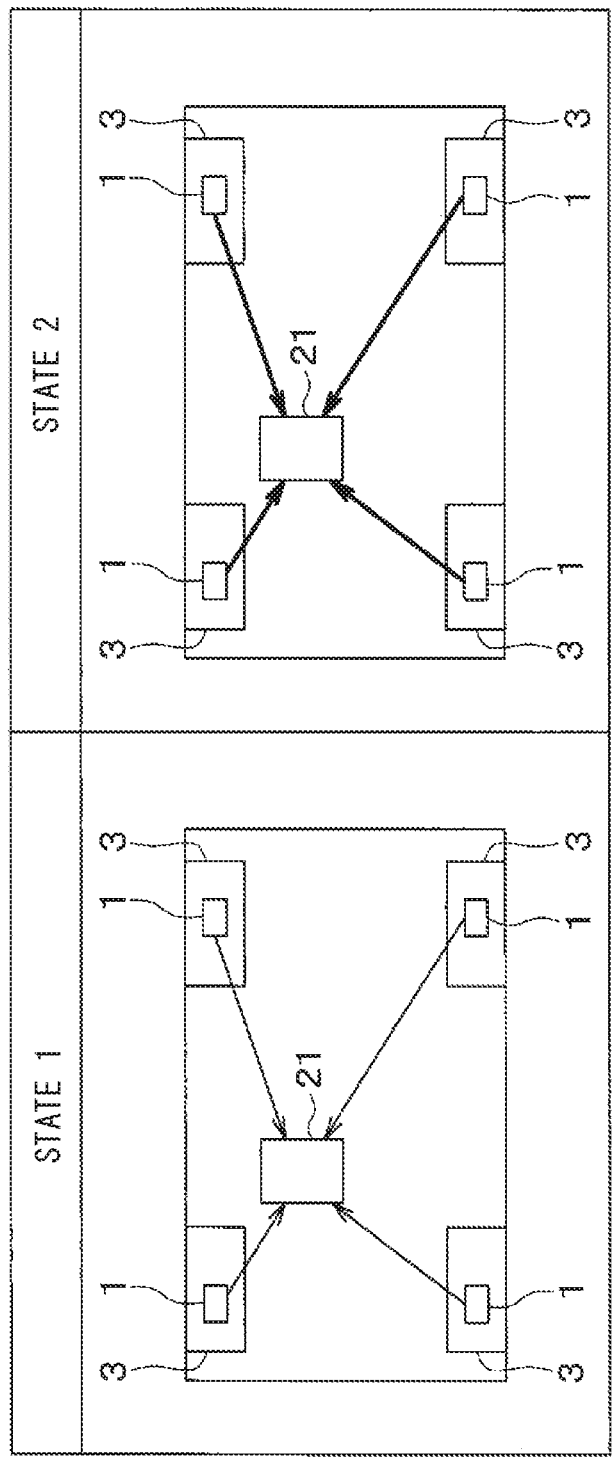
FIG. 13 is a diagram illustrating data transmission when a road surface state is determined in the second embodiment.

When such processes are performed, first, as illustrated in State 1 in FIG. 13, each of all the tire-side devices 1 transmits the road surface data to the vehicle-body-side system 2. Then, as illustrated in State 2, each of all the tire-side devices 1 transmits again the road surface data including the feature quantities of the own device and the feature quantities extracted by the other tire-side devices 1.

Thus, after each of the tire-side devices 1 is caused to transmit the road surface data, the tire-side device 1 receives the road surface data from the other tire-side devices 1. Then, each of the tire-side devices 1 is caused to transmit the road surface data including the feature quantities of the own device and the feature quantities extracted by the other tire-side devices 1. By doing so, in the same manner as in the first embodiment, it is also possible to provide the road surface state determination apparatus which allows the tire-side device 1 included in each of the tires to reliably transmit the road surface data to the vehicle-body-side system 2.

Note that, in the case of the second embodiment, it is sufficient that each of the tire-side devices 1 can communicate with the receiver 21, and the receiver 21 need not communicate with each of the tire-side devices 1. Accordingly, the tire-side devices 1 and the receiver 21 need not necessarily be in a mode in which each of the tire-side devices 1 and the receiver 21 can perform bidirectional communication with each other. The road surface state determination apparatus in the second embodiment is applicable not only to a four-wheeled vehicle, but also to a large-sized vehicle using a plurality of wheels the number of which is larger than four or the like. In this case also, the same effects as obtained in the first embodiment can be obtained.

Third Embodiment

A description will be given of the third embodiment. The third embodiment also uses a method of determining the road surface state different from that used in the first embodiment, and is otherwise the same as the first embodiment. Accordingly, a description will be given only of portions different from those in the first embodiment.

In the third embodiment, each of the tire-side devices 1 is caused to transmit the road surface data but, when the receiver 21 cannot receive the road surface data from any of the plurality of tire-side devices 1, the receiver 21 transmits a data request signal to the tire-side device 1 from which the road surface has been received successfully to cause the tire-side device 1 to transmit the road surface data.

Figure 14:
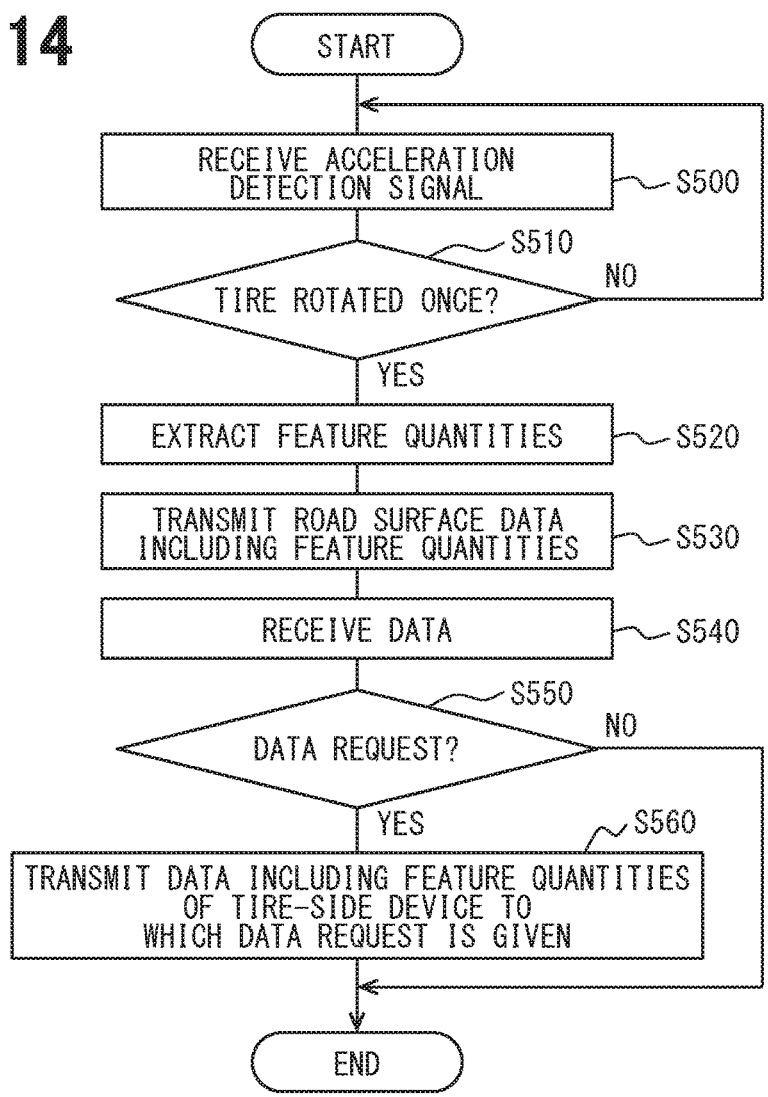
FIG. 14 is a flow chart of a data transmission process to be performed by each of tire-side devices according to a third embodiment.
Figure 15:
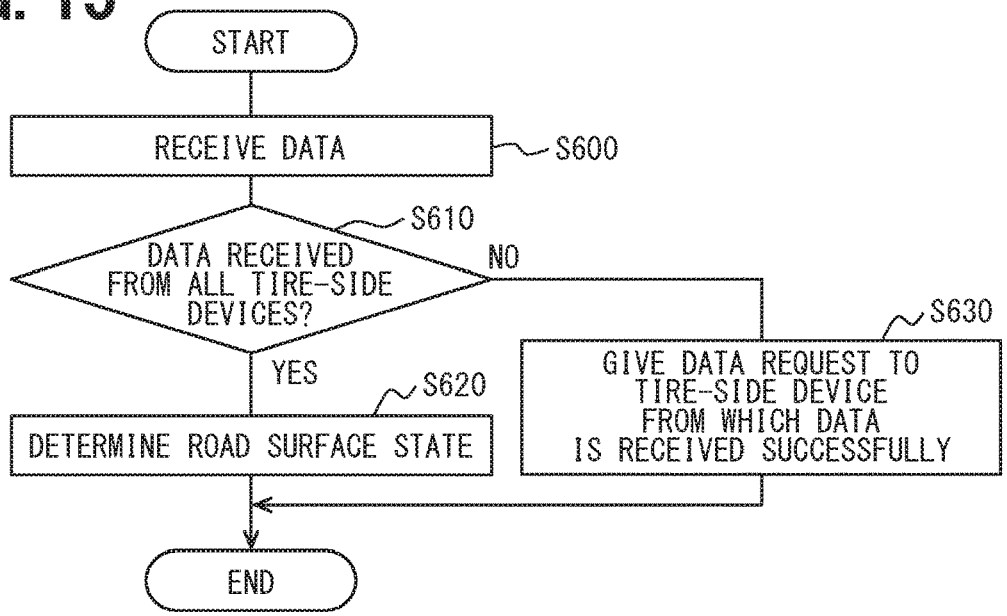
FIG. 15 is a flow chart of a road surface state determination process to be performed by a vehicle-body-side system according to the third embodiment.

Specifically, the waveform processing unit 11 of each of the tire-side devices 1 in the third embodiment performs a data transmission process illustrated in FIG. 14, while the road surface determination unit 25 of the receiver 21 performs a road surface state determination process illustrated in FIG. 15.

First, in the data transmission process in FIG. 14, in Steps S500 to S520, each of the tire-side devices 1 performs the same process as performed in Steps S100 to S120 in FIG. 6. In Step S530, in the same manner as in Step S140, each of the tire-side devices 1 transmits the road surface data including the feature quantities extracted by the own tire-side device 1. Then, in Step S540, each of the tire-side devices 1 performs a data reception process in the same manner as in Step S150 to receive the road surface data from another tire-side device 1. Subsequently, each of the tire-side devices 1 advances to Step S550 and determines whether or not there is a data request.

The data request mentioned herein is a request to transmit the road surface data which is output from the receiver 21, as will be described later. When there is the tire-side device 1 from which the receiver 21 cannot receive the road surface data, the data request is given to the tire-side device 1 from which the road surface data has been received successfully.

When an affirmative determination is made herein, each of the tire-side devices 1 advances to Step S560 and transmits, as the road surface data, the road surface data including not only the feature quantities extracted by the own tire-side device 1, but also the feature quantities included in the road surface data transmitted from the other tire-side devices 1. To allow the tire-side devices 1 by which the individual feature quantities are extracted to be recognized, the road surface data is also caused to include the ID information of each of the tire-side devices 1. Note that the road surface data is caused herein to include the feature quantities extracted by all the tire-side devices 1. However, it is sufficient that the receiver 21 determines the tire-side device 1 from which the road surface data has not been received successfully and gives a data request to the tire-side device 1, and the road surface data is caused to include at least the feature quantities extracted by the tire-side device 1 from which the road surface data has not been received successfully.

Meanwhile, in the road surface state determination process in FIG. 15, in Steps S600 to S620, each of the tire-side devices 1 performs the same process as performed in Steps S200, S210, and S260 in FIG. 7 to determine the road surface state. When the road surface determination unit 25 makes a negative determination in Step S610, the tire-side device 1 does not return to Step S600, but advances to Step S630 and outputs a data request signal to the tire-side device 1 from which the road surface data has been received successfully. For example, by causing the data request signal to include the ID information of the tire-side device 1 from which the road surface data has been received successfully, each of the tire-side devices 1 can recognize whether or not the data request is given to the tire-side device 1. At this time, as described above, it is also possible that the receiver 21 determines the tire-side device 1 from which the road surface data has not been received successfully and gives the data request to the tire-side device 1.

Thus, the receiver 21 transmits the data request signal to the tire-side device 1 from which the road surface data is received by the receiver 21. Then, in Step S560 in FIG. 14, each of the tire-side devices 1 transmits, as the road surface data, the road surface data including not only the feature quantities extracted by the own tire-side device 1, but also the feature quantities included in the road surface data transmitted from the other tire-side devices 1. Based on the road surface data, the receiver 21 can determine the road surface state.

Figure 16:
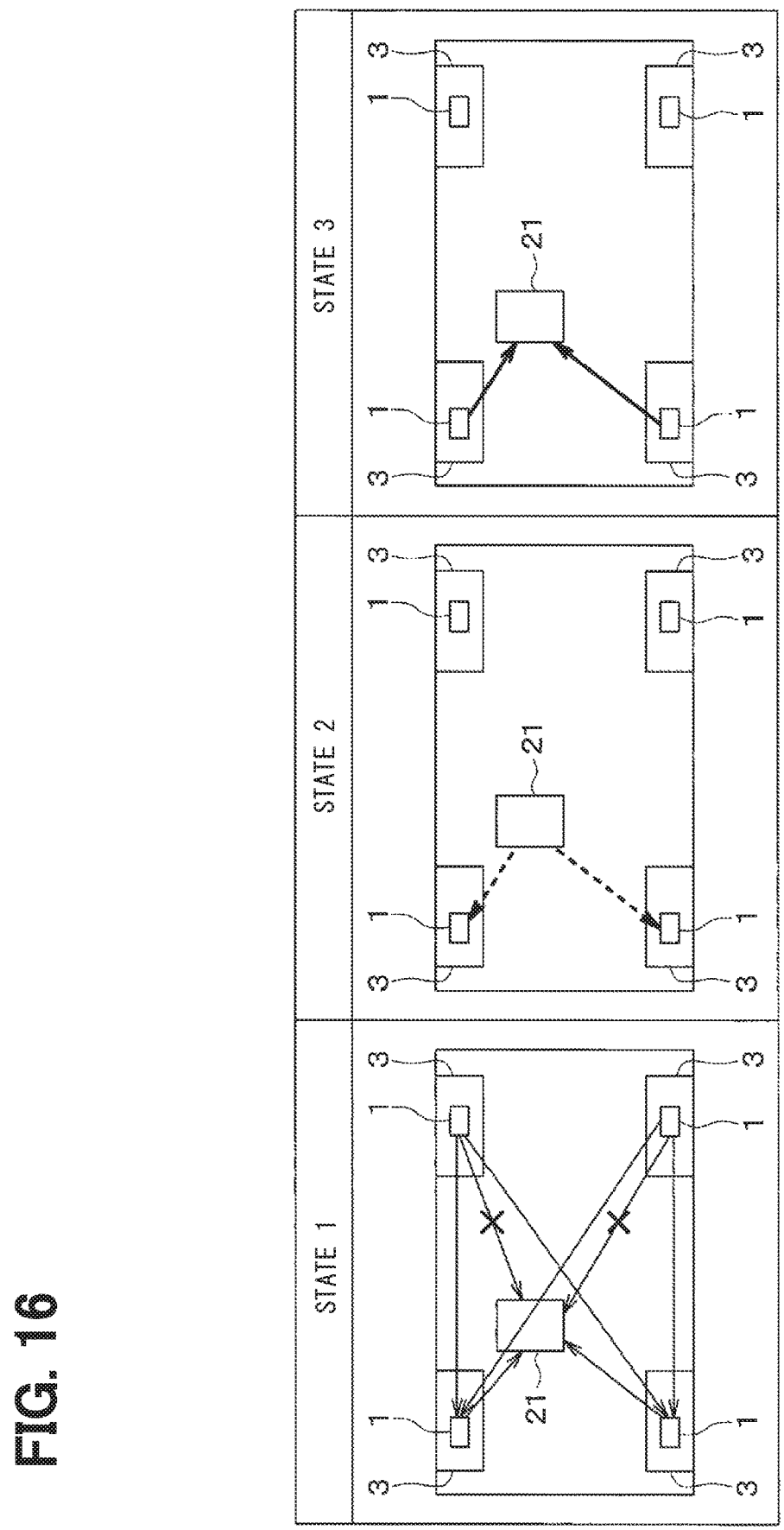
FIG. 16 is a diagram illustrating data transmission when a road surface state is determined according to the third embodiment.

When such a process is performed, first, as illustrated in State 1 in FIG. 16, each of all the tire-side devices 1 transmits the road surface data to the vehicle-body-side system 2. When the receiver 21 cannot receive the road surface data from any of the plurality of tire-side devices 1 as indicated by "X" in the drawing, as indicated by broken-line arrows in State 2, the receiver 21 transmits the data request signal to the tire-side device 1 from which the road surface data has been received successfully. Then, as illustrated in State 3, each of the tire-side devices 1 that has received the data request signal transmits the road surface data including the feature quantities extracted by the own tire-side device 1 and the feature quantities extracted by the other tire-side devices 1.

Thus, after each of the tire-side devices 1 is caused to transmit the road surface data, when there is the road surface data that has not been received successfully by the receiver 21, the receiver 21 transmits the data request signal to the tire-side device 1 from which the road surface data has been received successfully. By doing so, it is also possible to provide the road surface state determination apparatus which allows the tire-side device 1 included in each of the tires to reliably transmit the road surface data to the vehicle-body-side system 2.

The road surface state determination apparatus in the third embodiment is also applicable not only to a four-wheeled vehicle, but also to a large-sized vehicle using a plurality of wheels the number of which is larger than four or the like. In this case also, the same effects as obtained in the first embodiment can be obtained.

Figure 17:
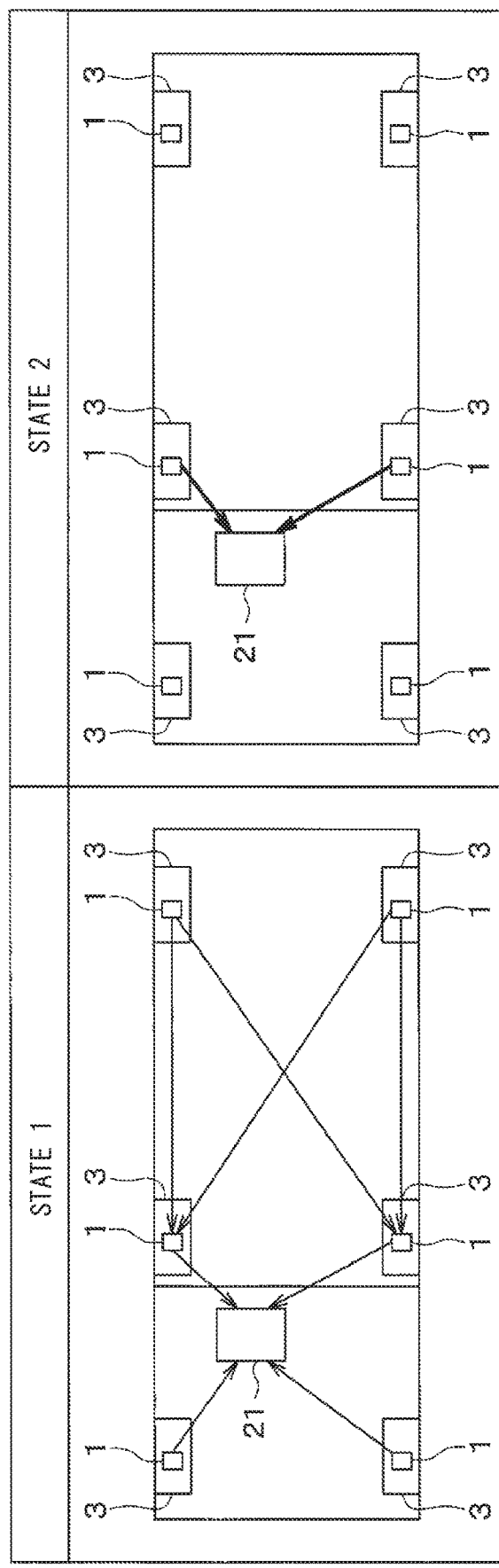
FIG. 17 is a diagram illustrating data transmission when the determination of the road surface state of the third embodiment is applied to a large-sized vehicle.

For example, as illustrated in State 1 in FIG. 17, the receiver 21 can receive the road surface data from the tire-side device 1 close to the receiver 21 but, from the tire-side device 1 distant from the receiver 21, the road surface data is not delivered to the receiver 21. However, the road surface data transmitted from the tire-side device 1 distant from the receiver 21 is delivered to the tire-side device 1 close to the receiver 21.

Accordingly, the receiver 21 receives the road surface data transmitted from the tire-side device 1 close to the receiver 21 first, and gives a data request to the tire-side device 1 distant from the receiver 21 via the tire-side device 1 close to the receiver 21. Then, as illustrated in State 2 in FIG. 17, the road surface data from the tire-side device 1 distant from the receiver 21 is transmitted to the receiver 21 via the tire-side device 1 close to the receiver 21. Thus, it is possible to determine the road surface state based on the road surface data from the tire-side device 1 included in each of the tires 3.

Other Embodiments

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

(1) For example, in each of the embodiments described above, the case where the vibration sensor unit 10 is formed of the acceleration sensor is shown by way of example. However, the vibration sensor unit 10 can also be formed of another element capable of detecting vibration such as, e.g., a piezoelectric element.

(2) In each of the embodiments described above, as the road surface data representing the road surface state appearing in the detection signal from the vibration sensor unit 10 of the tire-side device 1, the data including the feature quantities is used. However, this is only exemplary, and another data may also be used as the road surface data. For example, integral value data of individual vibration waveforms in the five regions R1 to R5 included in the vibration data during one rotation of the tire 3 may also be used as the road surface data or, alternatively, raw data represented by the detection signal may also be used as the road surface data.

(3) In each of the embodiments described above, the road surface determination unit 25 of the receiver 21 included in the vehicle-body-side system 2 determines the degree of similarity of the feature quantities to the support vectors to determine the road surface state or transmit the instruction signal.

However, this is also an example, and it may also be possible that any portion of the vehicle-body-side system 2, e.g., another ECU such as the brake ECU 22 determines the degrees of similarity, determines the road surface state, and transmits the instruction signal. Alternatively, it may also be possible to store the support vectors in each of the tire-side devices 1, allow the tire-side device 1 to determine the road surface state, and allow the tire-side device 1 to transmit data representing a result of the determination of the road surface state as the road surface data to the vehicle-body-side system 2.

(4) In the first embodiment, the received radio wave intensities are measured for the purpose of determining the central device and the peripheral devices. However, the tire-side device 1 to be set as the central device is naturally determined by the position of the tire-side device 1 and the position at which the receiver 21 is mounted. Accordingly, it may also be possible to preliminarily store, in the road surface determination unit 25, the ID information of, e.g., the tire-side device 1 attached to the tire 3 of the wheel closest to the receiver 21 or store, in each of the tire-side devices 1, data indicating whether the tire-side device 1 is either the central device or the peripheral device.

(5) Alternatively, it is also possible that each of the tire-side devices 1 includes an internal pressure sensor capable of detecting a tire pressure or an internal temperature sensor capable of detecting an in-tire temperature and transmits, to the vehicle-body-side system 2, data representing the tire pressure or the in-tire temperature as data related to the tire pressure.

What is claimed is:

1. A road surface state determination apparatus comprising:
 a plurality of tire-side devices to be attached individually to a plurality of tires of a vehicle, each of the tire-side devices including a vibration detection unit that outputs a detection signal corresponding to a magnitude of vibration of the tire, a waveform processing unit that generates road surface data representing a road surface state appearing in a waveform of the detection signal, and a first data communication unit that transmits the road surface data; and
 a vehicle-body-side system including a second data communication unit that receives the road surface data transmitted from the first data communication unit and a road surface determination unit that determines, based on the road surface data, a road surface state of a road surface on which the vehicle travels, wherein
 the plurality of tire-side devices are configured to receive the road surface data from each other,
 the first data communication units of the plurality of tire-side devices and the second data communication unit of the vehicle-body-side system are configured to enable bidirectional communication between the first data communication units and the second data communication unit,
 the road surface determination unit of the vehicle-body-side system measures received radio wave intensities when the second data communication unit receives the road surface data transmitted from the plurality of tire-side devices, sets at least one of the plurality of tire-side devices which is higher in received radio wave intensity than an other tire-side device to a central device, while setting the other tire-side device to a peripheral device, and causes the second data communication unit to transmit data indicating whether each of the plurality of tire-side devices is either the central device or the peripheral device, and
 the first data communication unit of the at least one of the plurality of tire-side devices which is set to the central device is caused to transmit, to the vehicle-body-side system, road surface data including the road surface data of the peripheral device received through communication.

2. The road surface state determination apparatus according to claim 1, wherein
after receiving the road surface data transmitted from each of the peripheral devices, the central device provides each of the road surface data of the central device and the road surface data of the peripheral devices with unique identification information and transmits, to the vehicle-body-side system, the road surface data of the central device and the road surface data of the peripheral devices with the respective unique identification information.

3. A road surface state determination apparatus comprising:
a plurality of tire-side devices to be attached individually to a plurality of tires of a vehicle, each of the tire-side devices including a vibration detection unit that outputs a detection signal corresponding to a magnitude of vibration of the tire, a waveform processing unit that generates road surface data representing a road surface state appearing in a waveform of the detection signal, and a first data communication unit that transmits the road surface data; and
a vehicle-body-side system including a second data communication unit that receives the road surface data transmitted from the first data communication unit and a road surface determination unit that determines, based on the road surface data, a road surface state of a road surface on which the vehicle travels, wherein
the plurality of tire-side devices are configured to receive the road surface data from each other, and
each of the plurality of tire-side devices transmits, to the vehicle-body-side system, inclusive road surface data including own road surface data and another road surface data received from another of the plurality of tire-side devices through communication.

4. The road surface state determination apparatus according to claim 3, wherein
each of the plurality of tire-side devices transmits the inclusive road surface data after transmitting the own road surface data alone.

5. A road surface state determination apparatus comprising:
a plurality of tire-side devices to be attached individually to a plurality of tires included in a vehicle, each of the tire-side devices including a vibration detection unit that outputs a detection signal corresponding to a magnitude of vibration of the tire, a waveform processing unit that generates road surface data representing a road surface state appearing in a waveform of the detection signal, and a first data communication unit that transmits the road surface data; and
a vehicle-body-side system including a second data communication unit that performs bidirectional communication with the first data communication unit and receives the road surface data and a road surface determination unit that determines, based on the road surface data, the road surface state of a road surface traveled by the vehicle, wherein
the plurality of tire-side devices are configured to receive the road surface data from each other, and
when the vehicle-body-side system fails to receive the road surface data of a part of the plurality of tire-side devices, the vehicle-body-side system provides a data request to one of the plurality of tire-side devices, the road surface data of which has been received successfully, to cause the one of the plurality of tire-side devices to transmit the road surface data of the part of the plurality of tire-side devices from the one of the plurality of tire-side devices.

* * * * *